(12) United States Patent
Karjee et al.

(10) Patent No.: US 11,777,866 B2
(45) Date of Patent: Oct. 3, 2023

(54) SYSTEMS AND METHODS FOR INTELLIGENT THROUGHPUT DISTRIBUTION AMONGST APPLICATIONS OF A USER EQUIPMENT

(71) Applicant: Samsung Electronics Co., Ltd., Suwon-si (KR)

(72) Inventors: Jyotirmoy Karjee, Bengaluru (IN); Ashok Kumar Reddy Chavva, Bengaluru (IN); Shubhneet Khatter, Bengaluru (IN); Raja Moses Manoj Kumar Eda, Pradesh (IN); Venkatesh M, Pradesh (IN); Diprotiv Sarkar, Bengaluru (IN); Hema Lakshman Chowdary Tammineedi, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 17/410,331

(22) Filed: Aug. 24, 2021

(65) Prior Publication Data

US 2021/0385170 A1 Dec. 9, 2021

Related U.S. Application Data

(63) Continuation of application No. PCT/KR2020/006199, filed on May 11, 2020.

(30) Foreign Application Priority Data

May 10, 2019 (IN) .............................. 201941018784
Jul. 30, 2019 (IN) .............................. 201941030785
May 7, 2020 (IN) .............................. 201941018784

(51) Int. Cl.
*H04L 47/62* (2022.01)
*H04L 47/22* (2022.01)
*H04L 47/24* (2022.01)

(52) U.S. Cl.
CPC ........ *H04L 47/6215* (2013.01); *H04L 47/225* (2013.01); *H04L 47/24* (2013.01)

(58) Field of Classification Search
CPC .... H04L 47/6215; H04L 47/225; H04L 47/24
See application file for complete search history.

(56) References Cited

U.S. PATENT DOCUMENTS

| | | |
|---|---|---|
| 9,634,806 B2 | 4/2017 | Damnjanovic et al. |
| 10,390,255 B2 | 8/2019 | Franklin et al. |

(Continued)

FOREIGN PATENT DOCUMENTS

| | | |
|---|---|---|
| CN | 103546922 A | 1/2014 |
| EP | 3 136 671 A1 | 3/2017 |

(Continued)

OTHER PUBLICATIONS

Extended European Search Report dated Feb. 25, 2022, issued in European Patent Application No. 20805921.2.

(Continued)

*Primary Examiner* — Azizul Choudhury
(74) *Attorney, Agent, or Firm* — Jefferson IP Law, LLP

(57) ABSTRACT

A method of distributing throughput intelligently amongst a plurality of applications residing at a User Equipment (UE) is provided. The method includes receiving, at the UE, recommended bit rate (RBR) information from a network node, the RBR information indicating a throughput value (Continued)

allocated to the UE, allocating a codec rate from the allocated throughput value to at least one voice over internet protocol (VoIP) application from the plurality of applications, and allocating, from remaining throughput value of the allocated throughput value, a bit rate to each of a plurality of non-VoIP applications from the plurality of applications, based on corresponding throughput requirement associated with the plurality of non-VoIP applications.

13 Claims, 24 Drawing Sheets

(56) References Cited

U.S. PATENT DOCUMENTS

| | | | |
|---|---|---|---|
| 10,659,995 B2* | 5/2020 | Yavuz | H04L 65/80 |
| 2018/0102871 A1 | 4/2018 | Wu | |
| 2019/0037001 A1 | 1/2019 | Fujishiro et al. | |
| 2019/0253190 A1 | 8/2019 | Novak et al. | |
| 2020/0045587 A1* | 2/2020 | Choi | H04W 72/542 |
| 2022/0046478 A1* | 2/2022 | Oyman | H04W 28/22 |

FOREIGN PATENT DOCUMENTS

| | | |
|---|---|---|
| KR | 10-2012-0027526 A | 3/2012 |
| WO | 2017/196248 A1 | 11/2017 |

OTHER PUBLICATIONS

Samsung, Discussion on SA4 Ls on the implementation issues of RAN-assisted codec adaptation and NR aspects of RAN delay budget reporting, 3GPP TSG RAN WG1 #97, Reno, USA, May 13-17, 2019, R1-1906889.
3rd Generation Partnership Project; Technical Specification Group Radio Access Network; NR; NR and NG-RAN Overall Description; Stage 2, TS 38.300, V15.5.0, Mar. 2019.
RAN2, LS to SA4 on RAN-assisted codec adaptation solution, 3GPP TSG-RAN WG2 Meeting #95bis, R2-167292, Kaohsiung, Oct. 10-14, 2016.
3rd Generation Partnership Project; Technical Specification Group Services and System Aspects; IP Multimedia Subsystem (IMS); Multimedia Telephony; Media handling and interaction, TS 26.114, V14.9.0, Mar. 2019.
3rd Generation Partnership Project; Technical Specification Group Radio Access Network; NR; Medium Access Control (MAC) protocol specification (Release 15), TS 38.321, V15.5.0, Mar. 2019.
Weng et al., Effect of Carrier Frequency Offset on Channel Estimation for SISO/MIMO-OFDM Systems, vol. 6, No. 5, May 2007.
Zhou et al., Quality of Service Improvement for High-Speed Railway Communications, vol. 11, Nov. 2014, ICT Management.
3rd Generation Partnership Project; Technical Specification Group Services and System Aspects; Codec for Enhanced Voice Services (EVS); Performance Characterization (Release 16) TR 26.952, V16.0.0, Mar. 2019.
International Search Report dated Sep. 18, 2020, issued in International Patent Application No. PCT/KR2020/006199.

* cited by examiner

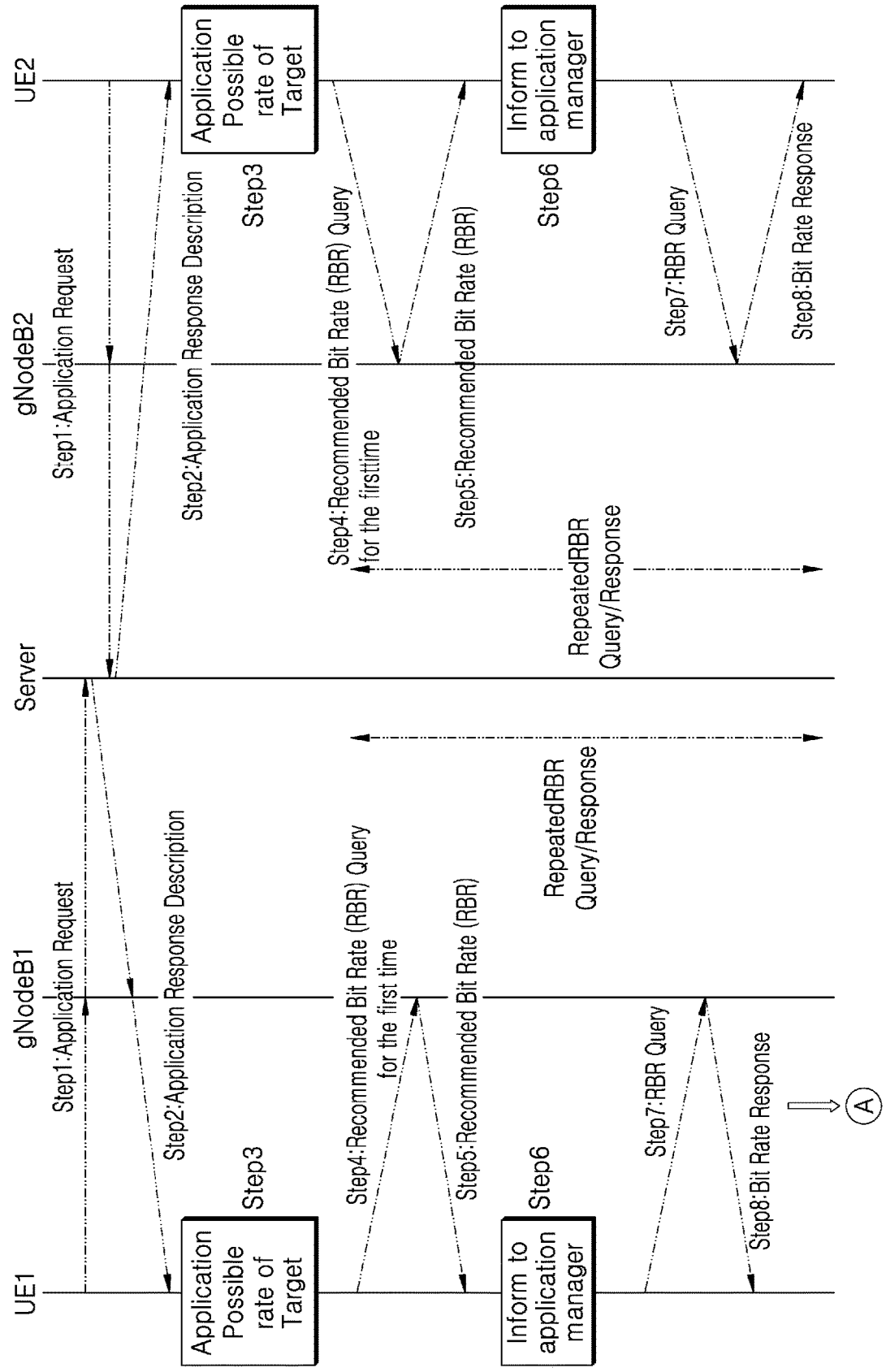

SYSTEMS AND METHODS FOR INTELLIGENT THROUGHPUT DISTRIBUTION AMONGST APPLICATIONS OF A USER EQUIPMENT

CROSS-REFERENCE TO RELATED APPLICATION(S)

This application is a U.S. National Stage application under 35 U.S.C. § 371 of an International application number PCT/KR2020/006199, filed on May 11, 2020, which is based on and claimed priority of an Indian patent application number 201941018784, filed on May 10, 2019, in the Indian Intellectual Property Office, and of an Indian patent application number 201941030785, filed on Jul. 30, 2019, in the Indian Intellectual Property Office, and of an Indian patent application number 201941018784, filed on May 7, 2020, in the Indian Intellectual Property Office, the disclosure of each of which is incorporated by reference herein in its entirety.

BACKGROUND

1. Field

The disclosure relates to throughput allocation. More particularly, the disclosure relates to distribution of throughput intelligently amongst applications of a User Equipment.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide distribution of throughput intelligently amongst applications of a User Equipment.

Additional aspects will be set forth in part in the description which follows and, in part, will be apparent from the description, or may be learned by practice of the presented embodiments.

In accordance with an aspect of the disclosure, a method of distributing throughput intelligently amongst a plurality of applications residing at a User Equipment (UE) is provided. The method includes receiving, at the UE, recommended bit rate (RBR) information from a network node, wherein the RBR information is indicative of a throughput value allocated to the UE. The method further comprises allocating a codec rate from the allocated throughput value to at least one Voice over Internet Protocol (VoIP) application from the plurality of applications. Further, the method comprises allocating, from remaining throughput value of the allocated throughput value, a bit rate information to each of a plurality of non-VoIP applications from the plurality of applications, based on corresponding throughput requirement associated with the plurality of non-VoIP applications. In an example, the codec rate is a throughput associated with a VoIP application and the bit rate is a throughput associated with a non-VoIP application.

In an embodiment, wherein the codec rate is a throughput associated with a VoIP application and the bit rate is a throughput associated with a non-VoIP application.

In an embodiment, wherein the operation of allocating the bit rate to each of the plurality of non-VoIP application based on corresponding throughput requirement comprises allocating the bit rate to at least one of a first set of applications and a second set of applications from the plurality of non-VoIP applications, wherein the first set of applications comprises one or more foreground applications, wherein the second set of applications comprises one or more background applications, and wherein the allocation of the bit rate to the second set of applications is done after the allocation of the bit rate to the first set of applications.

In an embodiment, wherein the operation of allocating the bit rate to at least one of the first set of applications and the second set of applications from the plurality of non-VoIP applications, comprises allocating the bit rate based on an allocation order, wherein the allocation order is a descending order determined based on a value of the corresponding throughput requirement associated with the plurality of non-VoIP applications.

In an embodiment, wherein the operation of allocating the codec rate from the allocated throughput value to the at least one VoIP application comprises, allocating the codec rate based on a codec rate indicator included in the RBR information.

In an embodiment, wherein the operation of allocating the codec rate from the allocated throughput value to the at least one VoIP application comprises, allocating the codec rate based on a quality feedback report associated with a packet transmitted by the at least one VoIP application.

In an embodiment, wherein the operation of allocating the codec rate based on the quality feedback report associated with the packet transmitted by the at least one VoIP application further comprises increasing a current codec rate by a predetermined value if the quality feedback report indicates a first quality, maintaining the current codec rate, if the quality feedback report indicates a second quality, and decreasing the current codec rate by the predetermined value if the quality feedback report indicates a third quality.

In an embodiment, wherein the method further comprises determining a throughput requirement corresponding to each of the at least one VoIP application and the plurality of non-VoIP application based on corresponding application response description (ARD) information, wherein the ARD information is indicative of bit rate requirement for a service requested by an application, transmitting an RBR query to the network node based on the determined throughput requirements, and receiving an RBR response comprising the RBR information indicative of the allocated throughput from the network node.

In accordance with another aspect of the disclosure, a user equipment configured to implement a method of distributing throughput intelligently amongst a plurality of applications residing at a user equipment (UE) is provided. The UE includes a processor, and a throughput handler and an application manager coupled to the processor. The disclosed method comprises receiving, at the UE, recommended bit rate (RBR) information from a network node, wherein the RBR information is indicative of a throughput value allocated to the UE. The method further comprises allocating a codec rate from the allocated throughput value to at least one voice over internet protocol (VoIP) application from the plurality of applications. Further, the method comprises allocating, from remaining throughput value of the allocated throughput value, a bit rate to each of a plurality of non-VoIP applications from the plurality of applications, based on corresponding throughput requirement associated with the plurality of non-VoIP applications. In an example, the codec rate is a throughput associated with a VoIP application and the bit rate is a throughput associated with a non-VoIP application.

In an embodiment, wherein the application manager is further configured to: allocate the bit rate to at least one of a first set of applications and a second set of applications from the plurality of non-VoIP applications, wherein the first set of applications comprises one or more foreground applications, wherein the second set of applications comprises one or more background applications, and wherein the allocation of the bit rate to the second set of applications is done after the allocation of the bit rate to the first set of applications.

In an embodiment, wherein the application manager is further configured to allocate the bit rate based on an allocation order, wherein the allocation order is a descending order determined based on a value of the corresponding throughput requirement associated with the plurality of non-VoIP applications.

In an embodiment, wherein the application manager is further configured to allocate the codec rate based on a codec rate indicator included in the RBR information.

In an embodiment, wherein the application manager is further configured to allocate the codec rate based on a quality feedback report associated with a packet transmitted by the at least one VoIP application.

In an embodiment, wherein the application manager is further configured to: increase a current codec rate by a predetermined value if the quality feedback report indicates a first quality, maintain the current codec rate if the quality feedback report indicates a second quality, and decrease the current codec rate by the predetermined value if the quality feedback report indicates a third quality.

In an embodiment, wherein the throughput manager is further configured to: determine a throughput requirement corresponding to each of the at least one VoIP application and the plurality of non-VoIP applications based on corresponding application response description (ARD) information, wherein the ARD information is indicative of bit rate requirement for a service requested by an application, transmit an RBR query to the network node based on the determined throughput requirements, and receive an RBR response comprising the RBR information indicative of the allocated throughput from the network node.

In an embodiment, wherein the codec rate is a throughput associated with a VoIP application and the bit rate is a throughput associated with a non-VoIP application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7A and 7B illustrate a flow diagram of a use case, according to various embodiments of the disclosure;

Throughout the drawings, like reference numerals will be understood to refer to like parts, components, and structures.

DETAILED DESCRIPTION

Figure 1A:
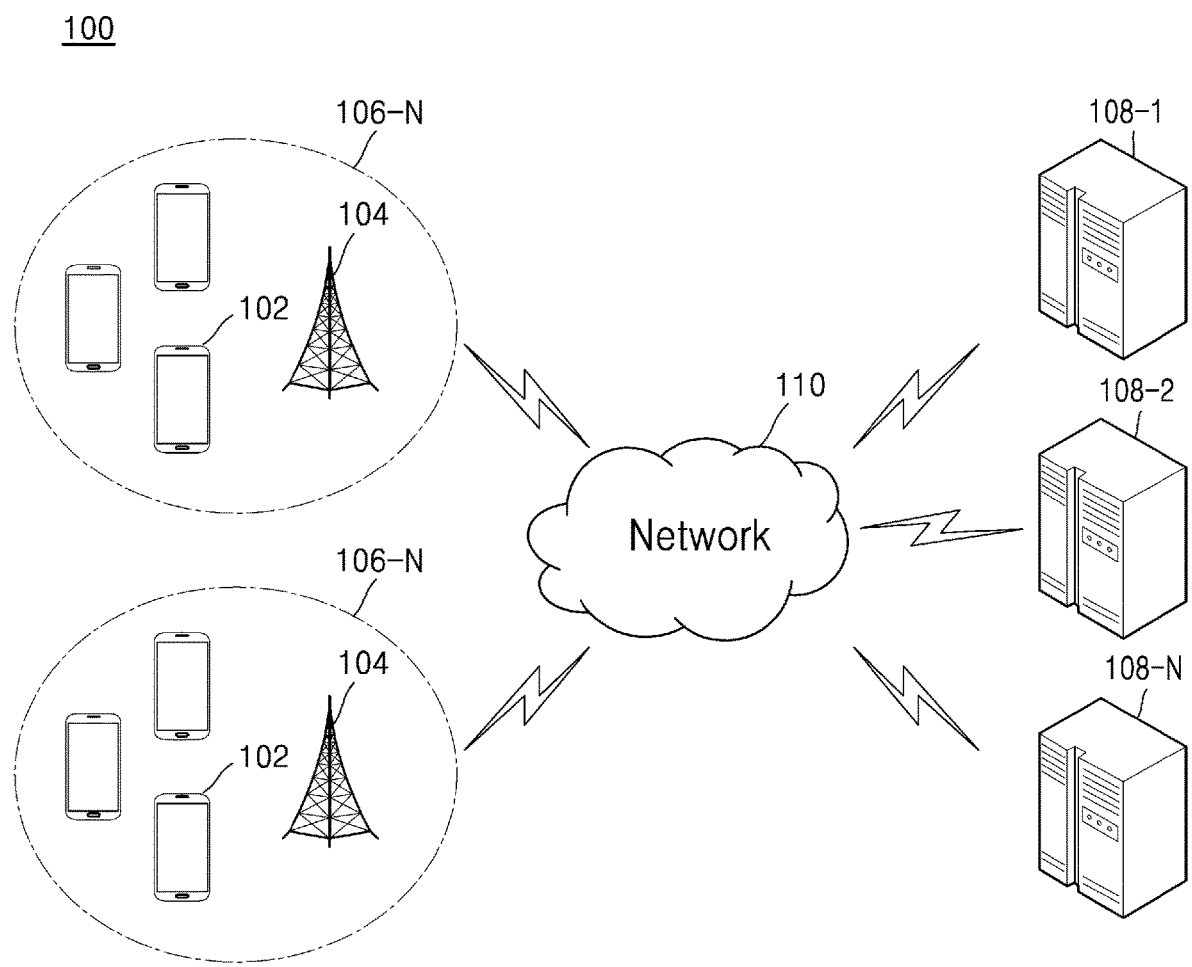
FIG. 1A illustrates a network topology environment implementing user equipment (UE) and FIG. 1B illustrates one or more applications residing on the UE, according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

In 5G New Radio (NR), recommended bit rate (RBR) is assigned by gNodeB to the user equipment (UE) using MAC control element (CE) entity. This designates the recommended bit rate (RBR) in a user equipment (UE) for a specific logical channel either in uplink or downlink. The MAC CE-entity stipulates the RBR to the upper layers (i.e., transport and application) of the UE through logical channel based on a cross-layer design protocol in UE. Based on specific applications rate of target, upper layer demands for a suitable rate to the MAC CE-entity. In implementation, the MAC CE-entity forward the query to gNodeB. In response, gNodeB provides a suitable RBR to UE. On receipt of the RBR, the UE drives the received RBR through physical/MAC CE entity to the upper layer where, suitable rate is utilized by applications to perform rate adaptation. Furthermore, rate utilization is performed by IP multimedia subsystem (IMS) applications such as VoIP, to adapt enhanced voice services (EVS) codec rate adaptation.

In the entire process, it is not clear that when and how to trigger an RBR query from UE for a specific logical channel, specific directions and desired bit rate. Also, it is not clear that when and how a UE can select a suitable rate of target in the application layer with reference to the RBR as a cross-layer design protocol.

Furthermore, the UE is unable to ensure an accurate RBR sections to adapt a suitable rate in the application layer, for example, to perform rate adaptation for applications, such as messaging applications, email applications, etc.

Thus, there is a need for a solution that overcomes at least one of the above deficiencies.

Embodiments of the disclosure will be described below in detail with reference to the accompanying drawings.

FIG. 1A illustrates a network topology environment implementing user equipment (UE) configured to implement a method of distributing throughput amongst applications residing thereon, according to an embodiment of the disclosure.

Referring to FIG. 1A, in an example, a network topology environment 100 comprises a plurality of UEs (e.g., a UE 102). Examples of the UE 102 may include, but are not limited to, a smartphone, a laptop, a tablet, a wearable computing device, and a personal digital assistant (PDA). In an example, the network topology environment 100 may further include a plurality of base stations 104, such as, for example, a gNodeB, also referred to as gNB. Each base station of the plurality of base stations 104 is configured to provide wireless communication services to the UE 102 present in a corresponding area 106-N.

In an example, the network topology environment 100 further comprises one or application servers 108-1, 108-2, to 108-N. The application servers may be implemented by one or more of service provides, enterprises content providers, and the like, for providing various services to the end users of the UE 102. Examples of such services include but are not limited to, voice over internet protocol (VoIP) calls, video calls, messaging service applications, email service applications, and e-commerce service applications.

The network topology environment 100 further comprises a network 110. In an example, the network 110 may include any number of wired or wireless networks, implementing various communication protocols and/or technologies that enable communication between the UE 102 and the one or more application servers (e.g., application server 108-1). Furthermore, in an example, the plurality of base stations 104 may be a part of the network 110.

Figure 1B:
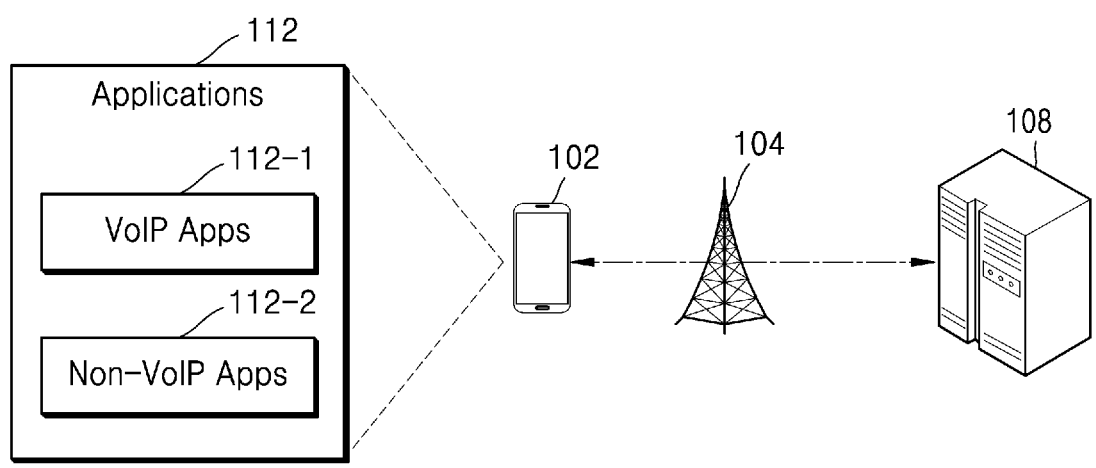

FIG. 1B illustrates one or more applications residing on a UE, according to an embodiment of the disclosure.

Referring to FIG. 1B, a UE 102 may include a plurality of applications 112. The plurality of applications 112 may include various applications, such as, for example, VoIP applications 112-1 and non-VoIP applications 112-2. The VoIP applications 112-1 may include any VoIP calling application. The non-VoIP applications 112-2 may include applications, such as, messaging applications, email applications, e-commerce applications, video calling applications, and gaming applications. The aspects of the disclosure are not limited to VoIP applications and may be extended and/or implemented for any internet protocol (IP) multimedia subsystem (IMS) application.

Referring to FIGS. 1A and 1B, in some example embodiment, the UE 102 may be configured to receive recommended bit rate (RBR) information from a network node, such as a base station (e.g., one of the plurality of base stations 104). In an example, the RBR information is indicative of a throughput value allocated to the UE 102 by the base station (e.g., one of the plurality of base stations 104). More particularly, in an example, the RBR may be assigned by a gNodeB to the UE 102 using MAC control element (CE) entity to provide bit rate information. At the UE 102, the bit rate information is passed on to the upper layers (i.e., transport or application).

In some example embodiments, the UE 102 may be configured to allocate a codec rate from the allocated throughput value to at least one VoIP application from the VoIP application 112-1. In an example, the codec rate is used for enhanced voice services (EVS) such as voice over internet protocol (VoIP). In an example, as per known techniques and specifications, nine codec rates may be provided for EVS applications. The nine codecs are: 9.6 kbps, 13.2 kbps, 16.4 kbps, 24.4 kbps, 32 kbps, 48 kbps, 64 kbps, 96 kbps and 128 kbps. In an example, the codec rate is used for VoIP applications, such as VoIP applications 112-1, and bit rate (i.e, throughput) is used for non-VoIP (foreground/background) applications, such as non-VoIP applications 112-2. In some example embodiment, the UE 102 may be configured to dynamically adapt the codec rate of the at least one VoIP application, for example, based on feedback reports received from the network side. The feedback report may be sent by a network node of the network 110 or from another UE 102. This reinforced learning based approach helps the UE 102 to adapt the encoder rate for the VoIP applications 112-1, which in turn, helps in optimizing the allocation of the throughput amongst the plurality of applications 112.

Subsequently, in some example embodiments, the UE 102 may be configured to allocate, from remaining throughput value of the allocated throughput value, a bit rate to each of the non-VoIP applications 112-2. The UE 102 may allocate the bit rate to each of the non-VoIP applications 112-2 based on corresponding throughput requirement associated with the plurality of non-VoIP applications 112-2. In some example embodiments, the UE 102 may be configured to allocate the remaining throughput value based on additional factors associated with the non-VoIP applications 112-2. For example, in some example embodiment, the UE 102 may perform the allocations based on whether a given non-VoIP application is a foreground applications or a background applications. Thus, the UE 102 implements an intelligent scheme of allocating throughput amongst the non-VoIP applications 112-2. This helps in optimizing the allocation of throughput amongst the plurality of applications 112.

By implementing the above-mentioned dynamic and adaptive scheme of allocation or distribution of throughput value amongst the plurality of applications 112 residing on the UE 102, the UE 102 is able to improve the quality of service of services provided to users. As an example, by adapting the codec rate as per the feedback report, the UE 102 ensures adequate throughput is provided to throughput dependent VoIP applications 112-1. This helps in improving or maintaining the service of VoIP applications 112-1. For example, a VoIP call may be established with good quality of service by ensuring adequate throughput is allocated to it.

Figure 2:
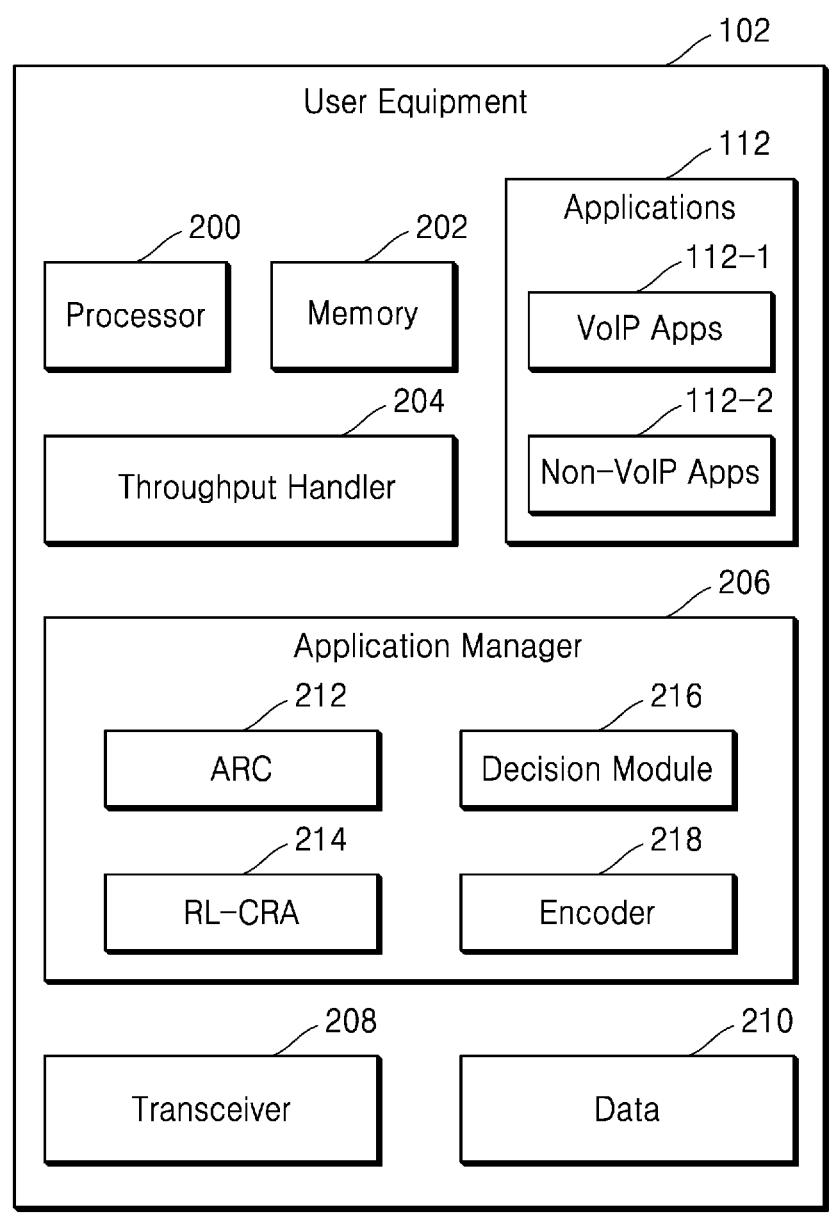
FIG. 2 illustrates a schematic block diagram illustrating various components of a UE, according to an embodiment of the disclosure.

FIG. 2 illustrates, a schematic block diagram illustrating various components of a UE, according to an embodiment of the disclosure.

Referring to FIG. 2, a UE 102 includes a processor 200, a memory 202, a throughput handler 204, an application manager 206, a transceiver 208, and data 210. In an example, the memory 202, the throughput handler 204, the application manager 206, and the transceiver 208 are coupled to the processor 200. Furthermore, in an example, the application manager 206 may further include an adaptive rate controller (ARC) 212, a reinforcement learning based code rate adapter (RL-CRA) 214, a decision module 216, and an encoder 218. The aforementioned components of the application manager 206 may be implemented as one or more of hardware, software, or a combination of both.

In an example, the processor 200 may be a single processing unit or a number of units, all of which could include multiple computing units. The processor 200 may be implemented as one or more microprocessors, microcomputers, microcontrollers, digital signal processors, central processing units, state machines, logic circuitries, and/or any devices that manipulate signals based on operational instructions. Among other capabilities, the processor 200 is configured to fetch and execute computer-readable instructions and data stored in the memory 202.

The memory 202 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the throughput handler 204 and the application manager 206, amongst other things, include routines, programs, objects, components, data structures, etc., which perform particular tasks or implement data types. The throughput handler 204 and the application manager 206 may also be implemented as, signal processor(s), state machine(s), logic circuitries, and/or any other device or component that manipulate signals based on operational instructions. Furthermore, the throughput handler 204 and the application manager 206 may be implemented in hardware, instructions executed by a processing unit, or by a combination thereof. The processing unit can comprise a computer, a processor, such as the processor 200, a state machine, a logic array or any other suitable devices capable of processing instructions. The processing unit can be a general-purpose processor that executes instructions to cause the general-purpose processor to perform the required tasks or, the processing unit can be dedicated to perform the required functions.

In another aspect of the disclosure, the throughput handler 204 and the application manager 206 may be machine-readable instructions (software) which, when executed by a processor/processing unit, perform any of the described functionalities. In an example embodiment, the throughput handler 204 and the application manager 206 may be provided in between Transport and application layer at the UE 102. The data 210 serves, amongst other things, as a repository for storing data processed, received, and generated by one or more of the processor 200, throughput handler 204, and the application manager 206.

According to aspects of the disclosure, the UE 102 may be configured to distribute throughput value allocated to the UE 102 by the network 110, amongst the plurality of applications 112, residing on the UE 102. To that end, in some example embodiments, the throughput manager 204 may be configured to determine a throughput requirement corresponding to each of the at least one VoIP application (e.g., at least one of VoIP applications 112-1) and the plurality of non-VoIP applications 112-2, based on corresponding application response description (ARD) information. In an example, the ARD information indicative of bit rate requirement for a service requested by an application (e.g., one of the plurality of applications 112) of the UE 102.

In an example, the ARD information is received in response to an application request made by an application of the UE 102. More particularly, in some example embodiments, any application among the plurality of applications 112 of the UE 102 that is seeking to avail service may send an application request to an application server 108, which is rendering the service. In response to the application request, the application server 108 responds with the ADR information, which is indicative of the bit rate requirement for the service requested by the application. In an example, the throughput handler 204 may be configured to send of the application request and the receive the ADR information, for example, using the transceiver 208.

In an example, the throughput requirement of the at least one VoIP application (e.g., at least one of VoIP applications 112-1) may be the codec rate that is determined by the relevant specification of the communication technology implemented by the network topology environment 100. In another example, where the at least one VoIP application is requesting a service from an application server 108, the throughput requirement specified by the application server 108 may be treated as the codec rate for the VoIP application. Thus, the throughput requirement and the codec rate for the at least one VoIP application are same and may be used interchangeably. As explained, it may be either network defined, for example, using the relevant specification, or may be defined by the application server 108 from which a VoIP service is requested.

After determining the throughput requirement of the at least one VoIP application (e.g., at least one of VoIP applications 112-1) and the non-VoIP applications 112-2, the throughput handler 204 may be configured to transmit recommended bit rate (RBR) query to the network node based on the determined throughput requirements. The RBR query, in an example, includes a value indicative of the throughput requirements of the at least one VoIP application among VoIP applications 112-1 and the non-VoIP applications 112-2.

In some example embodiments, the throughput handler 204 may be configured to receive an RBR response from the network node. In an example, the RBR response comprises RBR information indicative of the throughput allocated to the UE 102. The throughput allocated to the UE 102 is interchangeably referred to as allocated throughput. In an example, the throughput handler 204 receives the RBR response from the base station (e.g., one of the plurality of base stations 104). Furthermore, in some example embodiments, the throughput handler 204 may be configured to store the RBR response in the data 210. In an example, the application manager 206 may be configured to obtain the RBR information indicative of the allocated throughput from the data 210 for allocating the same to one or more of the plurality of applications 112.

In some example embodiments, the application manager 206 may be configured to allocate a codec rate from the allocated throughput to at least one VoIP application (e.g., at least one of VoIP applications 112-1) from the plurality of applications 112. In some example embodiments where the at least one VoIP application is not requesting for a service, the application manager 206 may allocate the codec rate to the at least one VoIP application based on a codec rate indicator included in the RBR information. The codec rate, in an example, may be understood as a minimum codec rate specified by the relevant specification.

In some example embodiments, where the at least one VoIP application has requested for a service and has received the bit rate requirement from the application server 108, the application manager 206 may be configured to allocate the codec rate, as per the bit rate requirement.

In some example embodiments, where the at least one VoIP application is in a service session, for example, an ongoing VoIP call, the application manager 206 may be configured to allocate the codec rate based on a quality feedback report associated with a packet transmitted by the at least one VoIP application. In some example embodiments, the application manager 206 may be configured to increase a current codec rate by a predetermined value if the quality feedback report indicates a first quality. In some example embodiments, the application manager 206-1 may be configured to maintain the current codec rate, if the quality feedback report indicates a second quality. In some example embodiments, the application manager 206 may be configured to decrease the current codec rate by the predetermined value if the quality feedback report indicates a third quality.

Thus, as explained above, the application manager 206 allocates the codec rate to the at least one VoIP application (e.g., at least one of VoIP applications 112-1) as per the example embodiments explained above. Subsequent to the allocation of the codec rate to the at least one VoIP application, the application manager 206 may then allocate the remaining throughput to the non-VoIP applications 112-2.

In some example embodiments, the application manager 206 may be configured to allocate a bit rate to each of the non-VoIP applications 112-2, from remaining throughput value of the allocated throughput value, based on corresponding throughput requirement of the non-VoIP applications 112-2. To that end, in some example embodiments, the application manager 206 may be configured to allocate the bit rate to at least one of a first set of applications and a second set of applications from the non-VoIP applications 112-2. In an example, the first set of applications comprises one or more foreground applications and the second set of applications comprises one or more background applications.

In some example embodiments, the application manager 206 may be configured to allocate the bit rate to at least one of the first set and second set of applications such that, the allocation of the bit rate to the second set of applications is done after the allocation of the bit rate to the first set of applications. In other words, the application manager 206 firstly allocates the bit rate to the applications running in the foreground and thereafter, if the remaining throughput is still available, the application manager 206 then allocates the bit rate to the background applications.

Furthermore, in some example embodiments, the application manager 206 may be configured to allocate the bit rate based on an allocation order. In an example, the allocation order is a descending order determined based on a value of the corresponding throughput requirement associated with the non-VoIP applications 112-2. That is, the non-VoIP applications with the highest bit rate requirement may be positioned at a first place in the allocation order, and the other non-VoIP applications may be arranged thereafter in decreasing order of bit rate requirement.

In some example embodiments, as explained above, the application manager 206 may allocate the bit rate such that the bit rate is allocated to the first set of applications first and based on the allocation order. Thereafter, the application manager 206 performs the allocation of the bit rate to the second set of applications as per the allocation order.

Figure 3A:
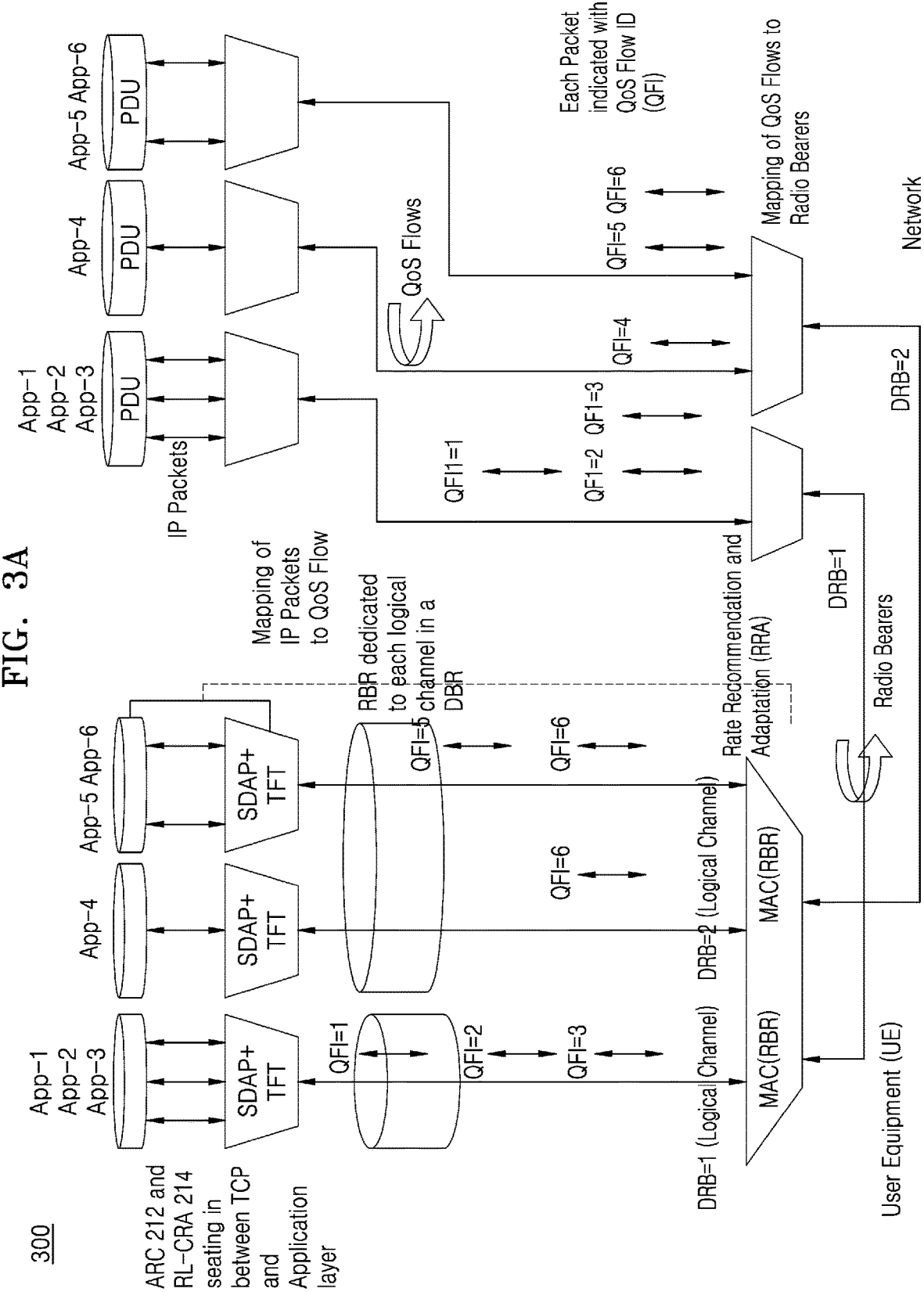
FIGS. 3A and 3B illustrate one or more flow models implemented in a UE, according to various embodiments of the disclosure.
Figure 3B:
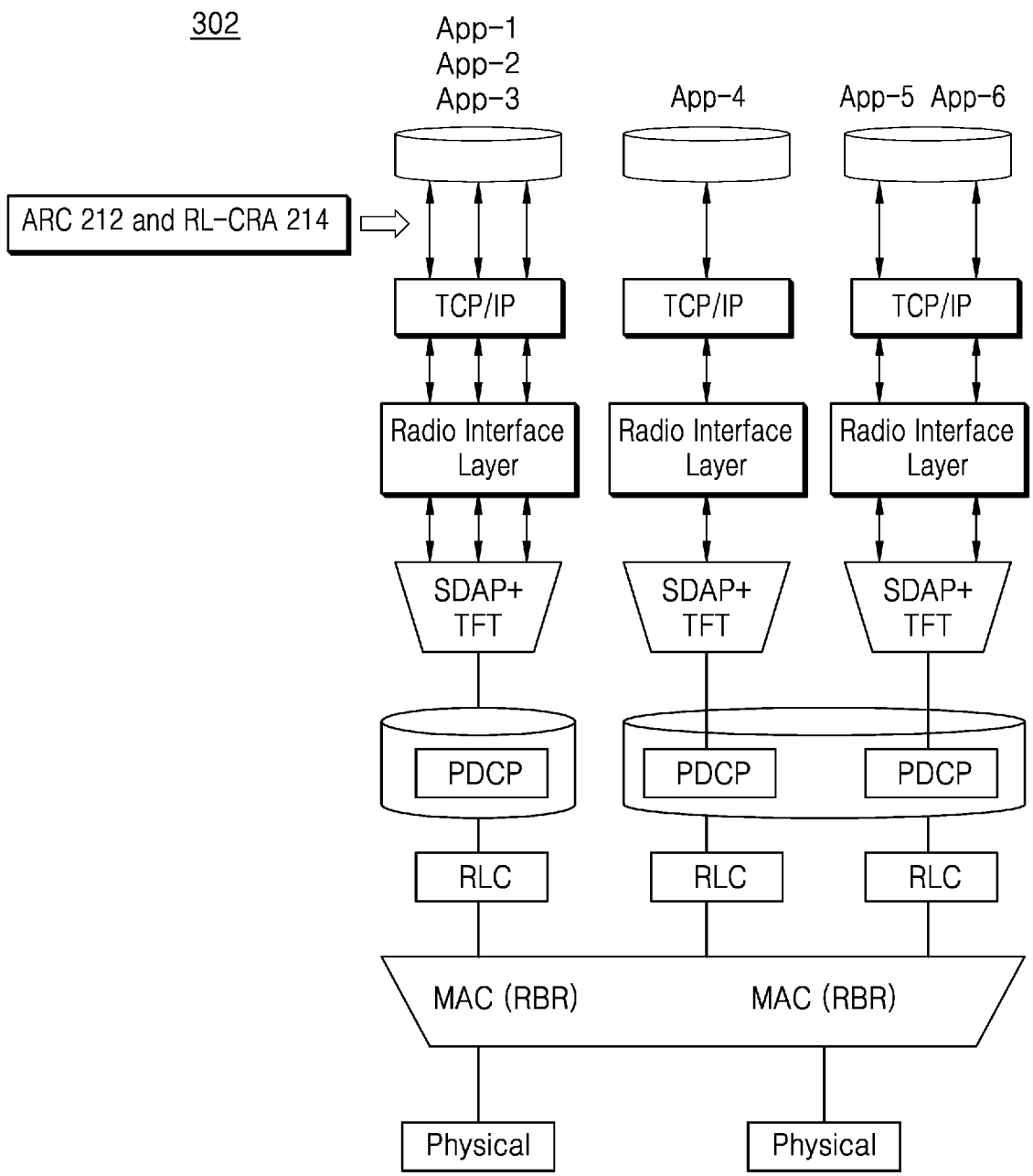

FIGS. 3A and 3B illustrate one or more flow models implemented in a UE, according to various embodiments of the disclosure.

FIG. 3A illustrates a Quality of Service (QoS) flow 300 in a protocol stack of a UE such as the UE of FIG. 1A, operating in a New Radio (NR) based communication system and implementing one or more components of the application manager 206, according to an embodiment of the disclosure. FIG. 3B illustrates an RBR query flow 302 in a UE, such as the UE of FIG. 1A, operating in a New Radio (NR) based communication system and implementing one or more components of the application manager 206, according to an embodiment of the disclosure.

Referring to FIGS. 3A and 3B, different services/applications, such as Apps 1 to 6. In an example, the Apps 1 to 4 may be non-VoIP or non-IMS apps, and apps 5 and 6 are IMS or VoIP apps. In an example, the apps 1 to 6 transmit IP packets through packet data unit (PDU) based on the user's request. The services/applications IP packet is first mapped to the QoS flow. Each IP packet is indicated with a QoS flow ID (QFI) which is further mapped to specific radio bearers, i.e., dedicated radio bearer (DRB) in both uplink and downlink directions through the network. The DRB passes the QFI to the lower layer (i.e., physical/MAC) of the UE. In the UE, the SDAP is responsible for mapping between QoS flow and logical channel of DRB for marking with QFI (for both uplink and downlink) through the lower layer. For each logical channel (group), MAC CE stipulates RBR to the upper layer (i.e., -transport and application) for the DRB. In FIG. 3A, the recommended bit rate information available at MAC control element (CE) in UE is recommended by the gNodeB. Further, the specific logical channel of DRB is assigned for the apps 1 to 6 through physical, MAC, RLC and PDCP layers, respectively. The Layer 3 in 5G NR is the Radio Resource Control (RRC) which configures all radio resources to enable UE and base station/gNodeB communications.

As mentioned above, in an example, the apps 1 to 6 may be of different type, such as Web browsers, instant messaging (IM), and VoIP application. The user tends to use Web browsers, IM and IP multimedia sub-system (IMS) applications such as VoIP parallelly; which increases the utilization of many applications in UE on daily basis. The utilization of various applications in parallel, increases the data consumption or application throughput requirements in UE. However, due to the physical environmental condition such as channel interference/noise, low bandwidth and high mobility, etc.; the application throughput requirement cannot be always supported in the UE. According to 5G medium access control (MAC) protocol specification, as the channel characteristics changes over time, UE queries for a recommended bit rate (RBR) from gNodeB to provide desired bit rate information. The gNodeB transmits RBR with codec rate indication to UE; to provide MAC entity which consists of bit rate information. The value of RBR transmitted by gNodeB depends on the channel conditions. The MAC entity is then transmitted from physical layer to the MAC layer and further RBR with codec rate indication is transmitted to TCP/IP and application layer through specific logical channel.

Furthermore, referring to FIG. 3B, the figure depicts that the SDAP with radio interface layer is accountable for mapping between QoS flow and logical channel of DRB for marking with QFI through Physical, MAC, RLC and PDCP layers, respectively. For each logical channel (group), MAC CE stipulates RBR to the upper layer where adaptive rate control (ARC) algorithm and reinforcement learning based codec rate adaptation (RL-CRA) algorithm are situated in-between TCP and application layer to perform rate/throughput distribution among various applications.

Figure 4:
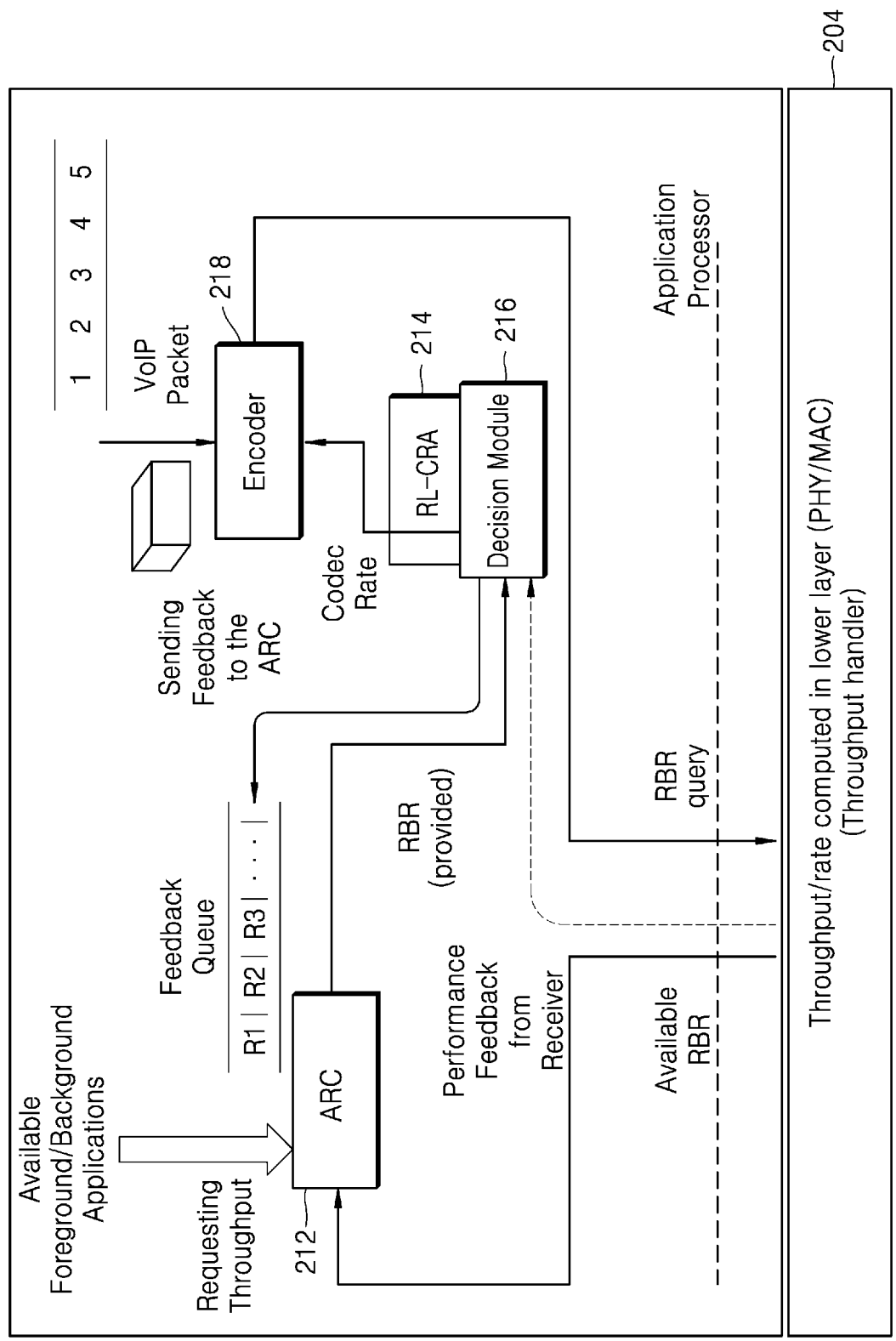
FIG. 4 illustrates an architecture model for rate adaptation in a UE, according to an embodiment of the disclosure.

FIG. 4 illustrates an architecture model 400 for rate adaptation in a UE, such as a UE of FIG. 1A, according to an embodiment of the disclosure. The architecture model 400 determines the Contribution/improvement in application processor (AP) and communication processor (CP), i.e., of the UE. Herein, the AP may be the Application manager 206 and the CP may be the throughput handler 204. In an example, the throughput/rate is computed in a lower layer (i.e., PHY/MAC), as explained below.

To describe the rate received by the UE, a high-speed train channel mode is considered as a use-case. The Doppler shift at time t is defined by Equation 1 and as mentioned below:

$$F_s(t) = f_d \cos(\theta(t))$$ Equation 1 where, $$\cos(\theta(t)) = \begin{cases} \dfrac{D_s/2 - vt}{\sqrt{D_{min}^2 + (D_s/2 - vt)^2}} & 0 \le t \le D_s/v \\ \dfrac{-3D_s/2 + vt}{\sqrt{D_{min}^2 + (-3D_s/2 - vt)^2}} & D_s/v \le t \le 2D_s/v \\ \cos[\theta(t \bmod (2D_s/v)] & 2D_s/v \le t \end{cases}$$

In this equation, $D_s$ is the distance between two consecutive gNodeBs and $D_{min}$ is the shortest distance between UE and gNodeB. Further, $f_d$ is considered as the maximum Doppler shift represented by:

$$f_d = \frac{f_c v}{c}.$$

where $f_c$ is the carrier frequency, v is the speed of the vehicle and c is the speed of the light. Further, a low pass filter is applied on $f_d$ to deduce channel frequency offset ($f_c f_o$) to smoothen the Doppler frequency. Moreover, we compute inter-carrier interference (ICI) per sub-carrier using Equation 2:

$$ICI_n(t) = \frac{(T_s f_{cfo}(t))^2}{2} \sum_{j=1, j \ne n}^{N} \frac{1}{(j-n)^2}$$ Equation 2 where $T_S$ is period of OFDM symbol, $f_c f_o(t)$ is channel frequency offset for time instant t and N is the total number of sub-carriers. The channel estimation error (CEE) is computed using Equation 3:

$$CEE(t) = \frac{2}{N} \sum_{n=0}^{N-1} (1 - \cos(2\pi n f_{cfo}^-(t)))$$ Equation 3

Finally, SINR per sub-carrier in the physical layer of the UE is computed at time t is given by Equation 4:

$$SINR_n(t) = \frac{P}{n_0 W + ICI_n(t) + CEE(t)}$$ Equation 4 where P is the transmit power, $n_0$ is noise power spectral density and W is the spectrum bandwidth. We assume that the values of P, $n_0$ and W are the constant throughout the experiment.

We compute effective SINR by averaging $SINR_n$ over the sub-carriers. The computed $SINR_n$ is mapped to lower (physical/MAC) layer rate/throughput ($T_L$) and further to upper layer throughput ($T_U$) using linear regression. The mapping is performed by collecting SINR and throughput logs from the physical/MAC layer and further collected TCP-dump to compute throughput of different applications using the UE. The mapping of the available recommended bit rate received at the TCP layer is denoted as $T_{L\_U}$ in UE. Since the physical/MAC layer throughput is linearly proportional to the throughput collected at the transport layer (using TCP-dump) in UE, the throughput at the upper layer is estimated.

Notations used in above-mentioned equations (Equations 1-4):
$D_s$=Distance between two consecutivegNodeBs;
$D_{min}$=Shortest distance between UE andgNodeBs;
$f_d$=Maximum Doppler shift;
$f_c$=Carrier frequency;
v=Speed of the vehicle;
c=Speed of light;
$f_{cfo}$=Channel frequency offset;
N=Total number of sub-carriers;
$T_s$=Period of OFDM symbol;
P=Transmit power;
$n_0$=Noise power spectral density;
W=Spectrum bandwidth; and
B=Bandwidth for the channel.

Once the throughput/rate (TL) is computed at lower layer (Physical/MAC) layer in communication processor (CP) of UE, the available TL is transmitted to upper layer (i.e., TCP/Application) of the application processor (AP) for throughput distribution based on Applications requirement. The TL which is arriving from CP is first received by Adaptive Rate Control (ARC) algorithm of AP in UE (say UE1). Further the mapped throughput TL_U is passed to the decision module 216. Decision module 216 is coupled to the RL-CRA 214 which does EVS/VoIP codec rate adaptation. The ARC 212 and RL-CRA 214 is situated in between TCP layer and Application layer. At first, the decision module 216 observes the available TL_U and informs the EVS encoder module to start transmitting the first packet (possibly at 9.6 kbps) to another UE (say UE2). Once the packet reaches to UE2, a quality of services (QoS) measurement (i.e., mean opinion score-objective listening quality (MOSLQO) is performed.

Further, UE2 send back the QoS measurement to the decision module of UE1. The decision module of UE1 fixes the next codec rate at which the upcoming packet is encoded. Further, using the RL-CRA 214 in decision module of UE2 chooses the best codec rate on looking the QoS measurement (i.e, MOS-LQO value) based on three conditions:

A) The available throughput sent by the ARC 212.
B) Based on available throughput, the current codec-rate is increased by one level (i.e., higher codec rate), decreased by one level (lower codec rate) or stay on the same codec rate as decided by the RL-CRA 214 of decision module (c.f FIG. 5).
C) The current codec rate decided by the decision module is sent to the message queuing of the ARC 212. Based on the rate, the ARC 212 redistributes the remaining throughput among foreground and background applications.

Therefore, the available throughput at AP of UE1 is assigned to the IMS (i.e., VoIP/EVS) applications as a first priority based on codec rate adaptation decided by the RL-CRA 214. The leftover throughput is distributed among foreground and background applications using the ARC 212 based on its required/predicted throughput.

Figure 5:
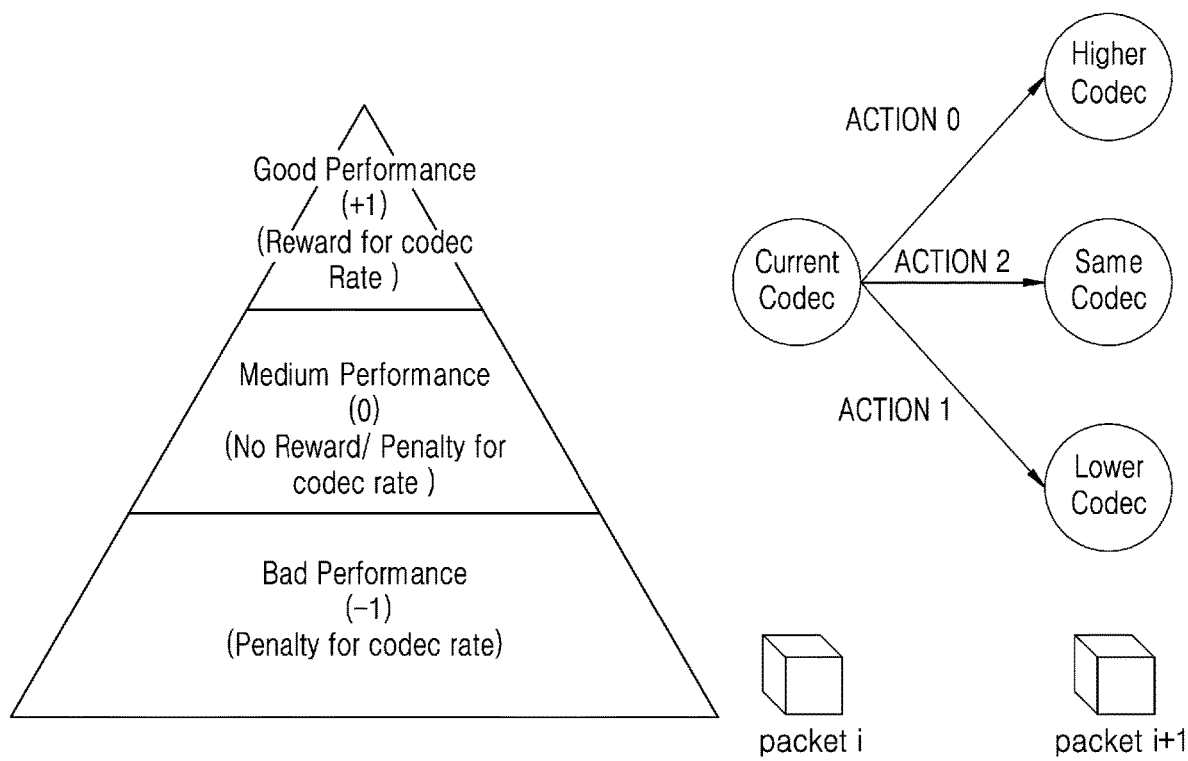
FIG. 5 illustrates actions taken by one or more components of an application manager implemented in a UE, according to an embodiment of the disclosure.

FIG. 5 illustrates actions 500 taken by one or more components of the application manager 206, according to an embodiment of the disclosure. In an example, the RL-CRA 214 coupled to the decision module 216 is configured to select the best codec rate based on the network condition and the ARC 212 to distribute throughput among foreground and background applications.

In an example, the RL-CRA 214 provides reward based on current state (i.e., current codec rate) to choose actions using Q-learning (reinforcement learning) [19], using below given equation:

$$Z_t(s, a) = Z_{t-1}(s, a) + k\left(Y(s, a) + +\vartheta \max_{a*} Z_t(s^*, a^*) - Z_{t-1}(s^*, a^*)\right)$$

Equation 5

Where $Z_t(s,a)$ in Equation 5 is the updated Q-learning function value for the codec rate sate s with the following action a denoted by ACTION to be selected.

If the ACTION, a=0 is chosen, a higher rate is assigned based on the current state (i.e., current codec rate) depending upon channel conditions. It provides a good QoS performance as a reward Y; (denoted by −1 sign) as channel condition is good.

If ACTION, a=1 is chosen, a lower codec rate is assigned based on current state/codec rate. It provides a poor QoS performance as a penalty Y; (denoted by −1 sign) considering channel condition is poor.

If ACTION, a=2 is chosen, same codec rate is assigned. It provides indication with no reward/penalty as Y (denoted by 0 sign) to the decision module considering the channel conditions neither good nor bad.

The learning rate is denoted by k to adapt a suitable codec rate and Zt (s,a) is the Q-learning function for current state s and a. In max a* Zt (s*,a*), the new action is maximized to select the best codec rate for VoIP/EVS packets based on the new state, s*. The term $\vartheta$ is the discount factor which provides a long term reward to select a suitable codec rate based on the RL-CRA 214.

Referring to FIG. 5, it further depicts that change in codec rate of VoIP packet from i to i+1 may affect MOS-LQO values. While implementing the RL-CRA 214 in UE, MOS-LQO value of different codec rate saturates after a certain duration. Hence, it is unnecessary to change the codec rates. In this case, a dynamic threshold (X−) is chosen to perform VoIP/EVS codec adaptation in UE so that codec rate doesn't have significant switches. Using RL-CRA algorithm, the codec rate is dynamically chosen based on "X"−. Once the best codec rate is selected for VoIP/EVS applications using the RL-CRA 214 as a first priority, the available rate/throughput is distributed to foreground and background applications as described below.

Once the available throughput, $T_{L\_U}$ is distributed to the EVS/VoIP application as a priority, the left-over throughput in $T_{L\_U}$ is distributed among foreground and background applications using the ARC 212 as explained herein. In an example, the ARC 212 predicts the required throughput for each application using a machine learning technique called Auto-Regressive Integrated Moving Average (ARIMA). Since ARIMA is capable to predict the required throughput for each application by capturing time series throughput data in the TCP-dump, it is more suitable for rate adaptation use case. However, in other examples, the ARC 212 may use other machine learning techniques to predict the required throughput for this use-case. In the ARC 212, the foreground and background, non IMS or non-VoIP applications are considered.

In an example, the ARC 212, while distributing throughput $T_{L\_U}$, prioritizes foreground applications over background applications, as is explained herein in below mentioned distribution technique.

Distribution Technique

1: We define $X_t = \sum_{i=1}^{m} x_{i_t}$ and $Y_t = \sum_{i=1}^{n} y_{j_t}$ where m and n are the number of foreground and background applications, respectively for time t.

$x_{i_t}$ and $y_{j_t}$ are the TCP throughput/rate* target requirement for ith foreground and jth background applications, respectively.

$x_{i_t}$ and $y_{j_t}$ are predicted using Auto-Regressive Integrated Moving Average (ARIMA) based on the previous required TCP throughput/rate 2: Consider RBR throughput received at TCP/IP layer from Physical/MAC layer given by $T_{L\text{-}U_t}$ at time t for specific logical channel.

3: If $T_{L\text{-}U_t} \leq X_t$ then:

Normalize the throughput for foreground applications as:

$$\alpha_{1_t} = \frac{x_{1_t}}{X_t}; \alpha_{2_t} = \frac{x_{2_t}}{X_t}; \ldots ; \alpha_{m_t} = \frac{x_{m_t}}{X_t}$$

Multiply. $T_{L\text{-}U_t}$ each normalized throughput to distribute received throughput among foreground applications as:

$\beta_{1_t} = T_{L\text{-}U_t} * \alpha_{1_t}, \beta_{di\ t} = T_{L\text{-}U_t} * \alpha_{2_t}, \ldots, \beta_{m_t} = T_{L\text{-}U_t} * \alpha_{m_t}$ $T_{L\text{-}U_t}$ is not assigned to background applications.

Else $T_{L\text{-}U_t} > X_t$;

Distribute required throughput $X_t$ to the foreground applications.

Distribute, $(T_{L\text{-}U_t} - X_t)$ for the background applications $(Y_t)$ such that $(T_{L\text{-}U_t} - X_t) \leq Y_t$, then:

(i). Normalize throughput for background applications as;

$$\gamma_{1_t} = \frac{y_{1_t}}{Y_t}; \gamma_{2_t} = \frac{y_{2_t}}{Y_t}; \ldots , \gamma_{n_t} = \frac{y_{n_t}}{Y_t}$$

(ii). Multiply, $(T_{L\text{-}U_t} - X_t)$ with each normalized throughput to distribute received throughput among foreground applications as:

$\delta_{1_t} = (T_{L\text{-}U_t} - X_t) * \gamma_{1_t}, \delta_{2_t} = (T_{L\text{-}U_t} - X_t) * \gamma_{2_t}, \ldots,$
$\delta_{m_t} = (T_{L\text{-}U_t} - X_t) * \gamma_{m_t}$ (iii). Else, distribute required throughput $Y_t$ to all background applications $(\delta_{1_t} = y_{1_t}; \delta_{2_t} = y_{2_t}; \ldots ; \delta_{n_t} = y_{n_t})$ In accordance with the above distribution technique, if the rate/throughput ($T_{L\_U}$;t) available at TCP layer is less than throughput requirement of foreground applications ($X_t$) at time t, the ARC 212 normalizes the required throughput by each foreground application. Furthermore, the ARC 212 multiplies ($T_{L\_U}$;t) with this normalized throughput, to compute throughput distribution of each foreground application. If $T_{L\_U}$;t exceeds $X_t$ at time t, the ARC 212 provides the throughput for each foreground application. If the remaining throughput, ($T_{L\_U}$;t−$X_t$) is less than the throughput required by the background applications ($Y_t$), the ARC 212 normalizes the required throughput by each background application. Furthermore, the ARC 212 multiplies ($T_{L\_U}$;t−$X_t$) with this normalized throughput to compute throughput distribution for each background application. If $(T_{L\_U};t-X_t)$ is more than $Y_t$, the ARC 212 provides required throughput for each background application.

Figure 6:
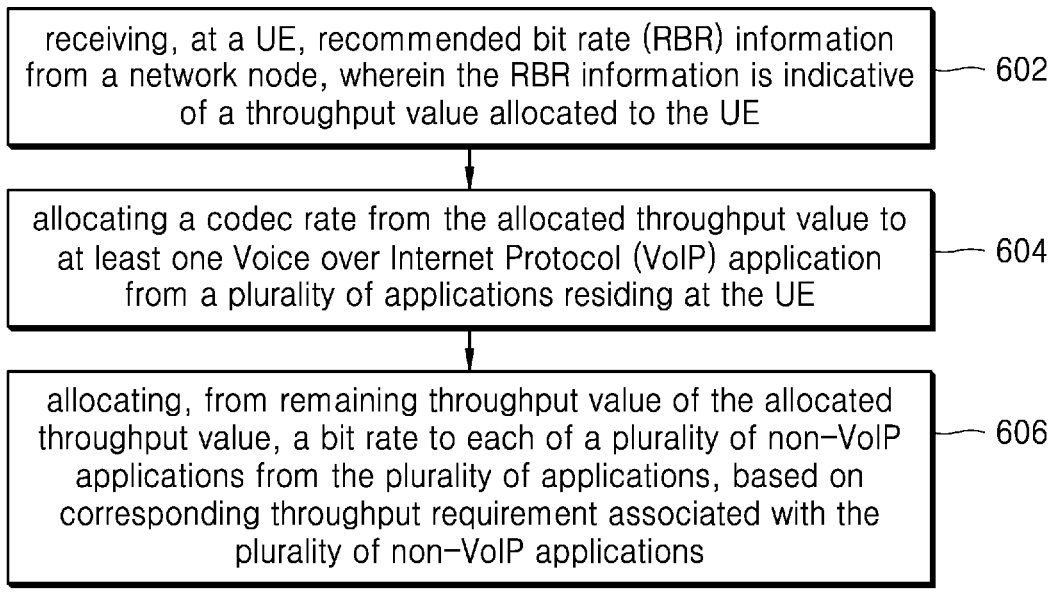
FIG. 6 illustrates a method of distributing throughput amongst a plurality of applications residing at a UE, according to an embodiment of the disclosure.

FIG. 6 illustrates a method of distributing throughput amongst a plurality of applications residing at a UE, such as the UE of FIG. 1A, according to an embodiment of the disclosure.

Referring to FIG. 6, a method 600 of distributing throughput amongst a plurality of applications residing at a UE may be implemented using the UE of FIG. 1A. For the sake of brevity, details of the disclosure that have been explained in detail with reference to the descriptions of FIGS. 1A, 1B, and 2 above are not explained in detail herein.

The method 600 commences at operation 602, where, RBR information indicative of a throughput value allocated to the UE is received at the UE from a network node, such as the base station (e.g., one of the plurality of base stations 104). In some example embodiments, the method includes determining a throughput requirement corresponding to each of the at least one VoIP application and the plurality of non-VoIP application based on corresponding application response description (ARD) information. Herein, the ARD information is indicative of bit rate requirement for a service requested by an application. The ARD information is received in response to an application request sent by the application.

In some example embodiments, the method further includes transmitting an RBR query to the network node based on the determined throughput requirements. Furthermore, the method includes, receiving an RBR response comprising the RBR information indicative of the allocated throughput from the network node, such as the base station (e.g., one of the plurality of base stations 104).

At operation 604, a codec rate from the allocated throughput value is allocated to at least one Voice over Internet Protocol (VoIP) application from a plurality of applications residing at the UE. In some example embodiments, the operation of allocating the codec rate from the allocated throughput value to the at least one VoIP application comprises, allocating the codec rate based on a codec rate indicator included in the RBR information.

In some example embodiments, the operation of allocating the codec rate from the allocated throughput value to the at least one VoIP application comprises, allocating the codec rate based on a quality feedback report associated with a packet transmitted by the at least one VoIP application.

In some example embodiments, the operation of allocating the codec rate based on the quality feedback report associated with the packet transmitted by the at least one VoIP application further comprises increasing a current codec rate by a predetermined value if the quality feedback report indicates a first quality. In another example, the operation includes maintaining the current codec rate, if the quality feedback report indicates a second quality. In another example, the operation includes decreasing the current codec rate by the predetermined value if the quality feedback report indicates a third quality.

At operation 606, the method 600 includes allocating, from remaining throughput value of the allocated throughput value, a bit rate to each of a plurality of non-VoIP applications from the plurality of applications, based on corresponding throughput requirement associated with the plurality of non-VoIP applications. In some example embodiments, the method 600 includes allocating the bit rate to at least one of a first set of applications and a second set of applications from the plurality of non-VoIP applications. Herein, the first set of applications comprises one or more foreground applications and the second set of applications comprises one or more background applications. Furthermore, in some example embodiments, the allocation of the bit rate to the second set of applications is done after the allocation of the bit rate to the first set of applications.

In some example embodiments, the operation of allocating the bit rate to at least one of the first set of applications and the second set of applications from the plurality of non-VoIP applications, includes allocating the bit rate based on an allocation order. Herein, the allocation order is a descending order that is determined based on a value of the corresponding throughput requirement associated with the plurality of non-VoIP applications.

In some example embodiments, the method 600 may include distributing the throughput such that bit rates are first allocated to the VoIP applications based on the allocation order of the VoIP applications, and subsequently the same process is followed for the non-VoIP applications.

Figure 7B:
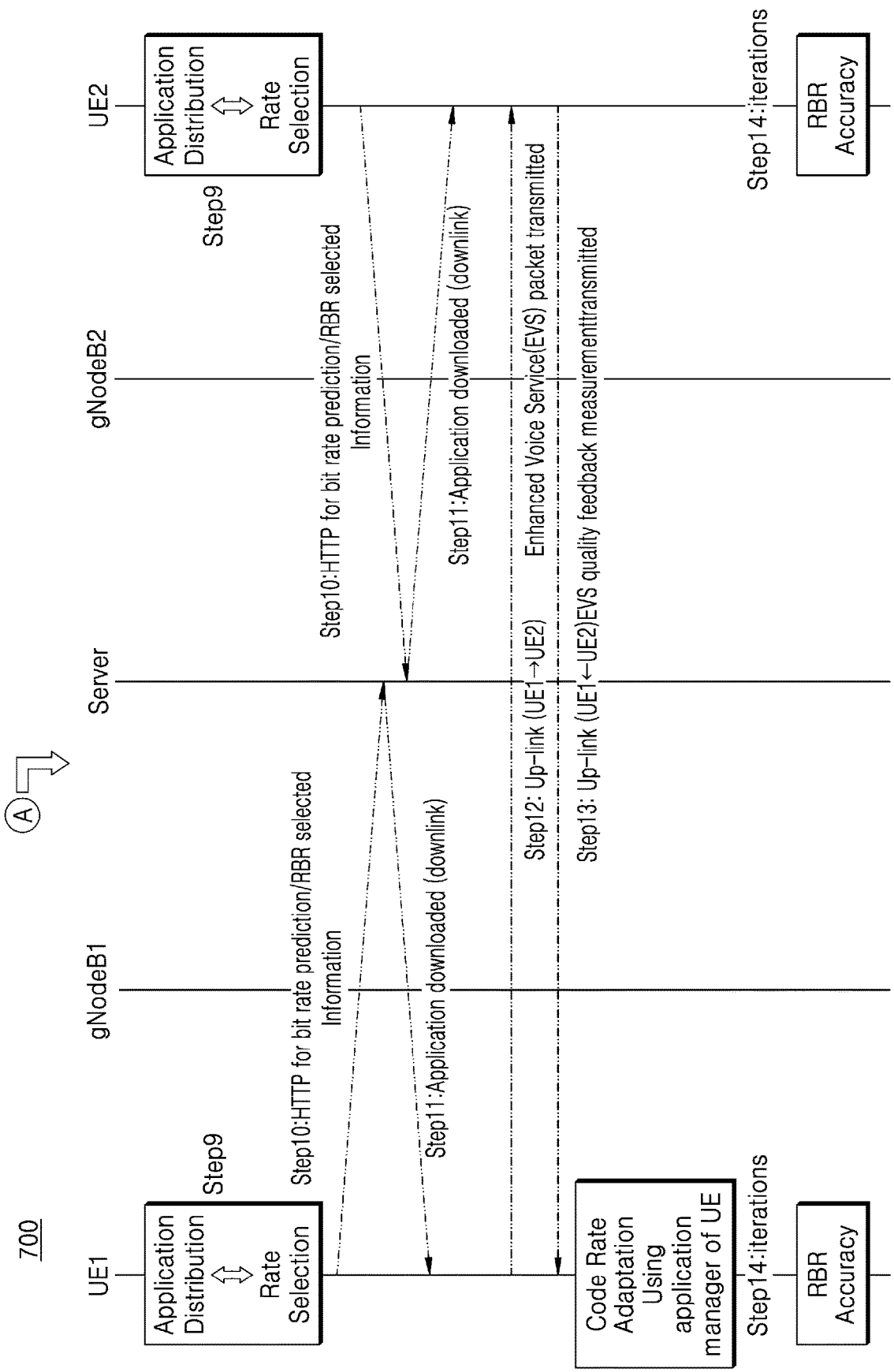

FIGS. 7A and 7B illustrate a flow diagram 700 of a use case, according to various embodiments of the disclosure. The use case depicts application DL communication between two UEs: UE1 and UE2, that are connected to respective base stations: gNodeB 1 and gNodeB2 respectively. Furthermore, the UE1 and UE2 are availing services from an application server: Server. According to the flow diagram 700, the following steps are performed.

In an example, the UE1 and UE2 are placed in two different geographical locations. In an example, the UE1 and UE2 are communicating through gNodeB1 and gNodeB2, respectively, where at least one of the UE is in motion. Further, UE1 and UE2 can upload/download applications from a central server located remotely in the deployment scenario.

Referring to FIGS. 7A and 7B, at least one of the UE (or both the UE's) can request applications from the server as shown in Step 1. In response, the server provides the application response description to UE1/UE2 through gNodeB1/gNodeB2 as shown in Step 2. In Step 3, the UE1/UE2 uses the RRA methodology to select for a possible rate of target for specific applications. In this case, application provides its bandwidth range and information about buffer status.

The UE1/UE2 experiences poor QoS due to the mobility condition and degradation in applications bandwidth experienced by the user. In such scenario, UE1/UE2 takes local network assistance from gNodeB1/gNodeB2 to predict its bandwidth as shown in Step 4. In Step 5, the gNodeB1/gNodeB2 transmits RBR MAC CE or predicted bandwidth to the UE MAC entity. The recommended bit for specific logical channel and direction are indicated by uplink or downlink streams. Once RBR CE is received, UE MAC entity indicates the RBR logical channels or directions. With RBR, the UE selects the rate of target segment through Physical layer suitably for Application layer (i.e., rate is selected for applications) as shown in Step 6. Based on the rate receives by the application layer, the MAC entity asks for a recommended query to gNodeB1/gNodeB2 as shown in Step 7. In Step 8, once RBR query is received by gNodeB1/gNodeB2 from UE1/UE2, a bit rate query response is configured for logical channels and directions. In response to the bit rate query, UE1/UE2 receives updated RBR at MAC CE which is further utilized by the applications to choose suitable rates using a distributed algorithm called ARC (as shown in Step 9).

The distributed algorithm is situated in-between the TCP and application layer which schedule suitable rates to the applications. The UE1/UE2 transmits a HTTP requests to the server (via gNodeB1/gNodeB2) based on the scheduled predicted rate information assigned to the applications as shown in Step 10. In Step 11, after receiving the HTTP request, the application starts downloading from specific server and the downloaded information is transmitted to UE1/UE2. In Step 12, UE1 requests an uplink communication to UE2 to transmit a EVS packet. In Step 13, after the first packet reaches the UE2, there is a quality feedback measurement which arrives from UE2 to UE1 containing the mean opinion score (MOS) value to adapt codec rate. In Step 12 and 13, both UE1 and UE2 have the RL-CRA 214 to adopt the best suitable codec rate based on the channel conditions. In an example, the step 1 to Step 13 are repeated (as shown in Step 14) to accurately predict the RBR.

In an example experiment, TCP-dump data was collected to compute throughput of different applications using a UE and python was used to validate the functions of the ARC 212 in the upper layer for throughput distribution based on foreground and background applications, respectively. To validate the RL-CRA 214, voice samples were used and fed into the encoder, where the voice samples are processed as per the EVS standard. Further, simulations in MATLAB were conducted to validate the methodology described herein, in lower layer of UE. In the simulation set-up, the similar deployment set-up as given in for the high speed train (HST) channel model as is known art was used. The simulation for HST model is performed for vehicle (i.e., train) speed of 100 km/h, 250 km/h and 350 km/h. We consider transmission of 5000 sub-frames per simulation with 4 GHz of carrier frequency and 10 MHZ of bandwidth. The detailed simulation parameters are provided in Table 1, below.

TABLE 1

| Parameters Considered for Simulation | |
|---|---|
| $D_s$ | 50 m |
| $D_{min}$ | 1 m |
| Velocity | 100 km/h, 250 km/h, 350 km/h |
| Carrier Frequency | 4 GHz |
| Bandwidth | 10 MHz |
| Number of sub-frames | 5000 |

According to aspects of the disclosure, the HST model is considered to capture the signaling condition of the network due to the mobility of UE. The network behavior captured at the UE, reflects poor QoS at the Physical/MAC layer during mobility. Due to this reason, UE encounters degradation of QoE in the application layer. The HST model considers a propagation model to compute Doppler shift, channel estimation error, SINR and physical layer throughput. The captured Physical layer throughput is further mapped to MAC throughput for controlling the rate adaptation with the Application layer in UE during mobility. Moreover, based on the network condition, gNodeB provides recommended bit rate which is adjusted by UE to distribute the rate among all applications using ARC and RL-CRA algorithms, respectively.

FIGS. 8 to 17, depict experimental results, according to various embodiments of the disclosure.

Figure 8:
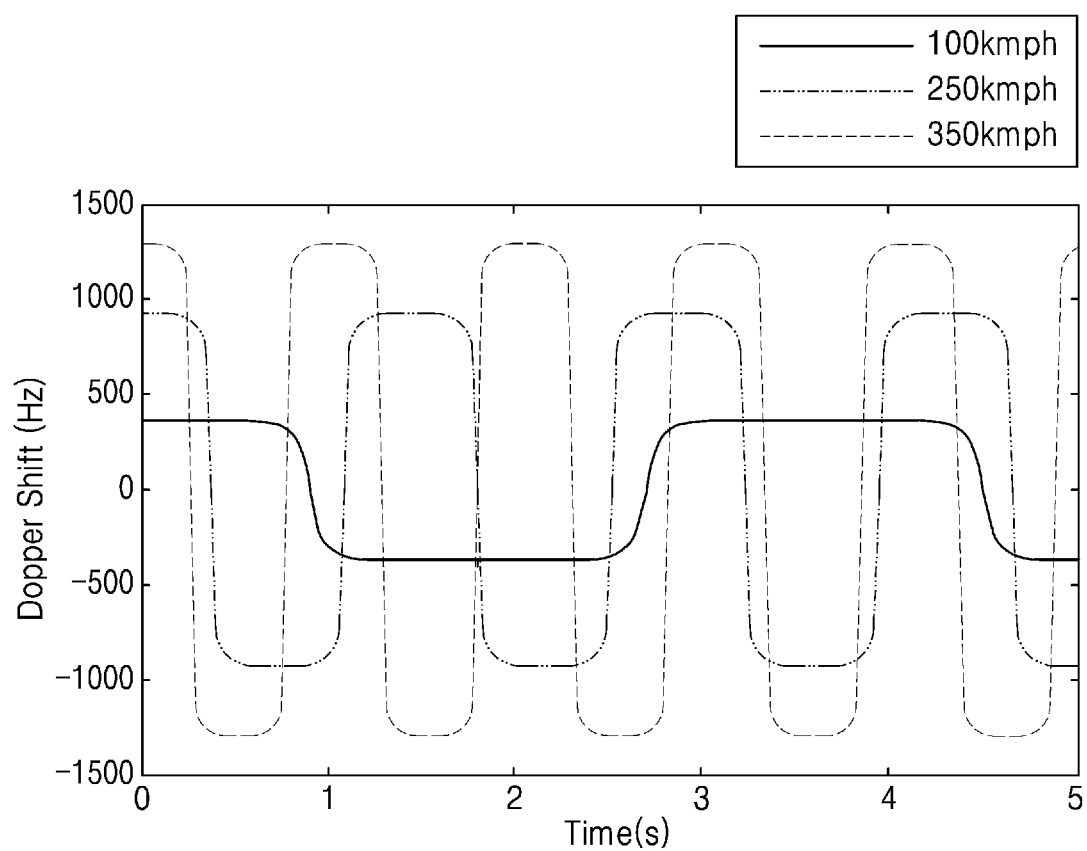
FIG. 8 depicts experimental results, according to an embodiment of the disclosure.

The Doppler shift for every time instance is computed to verify the throughput improvement in CP level (of UE), as also illustrated in FIG. 8. The figure depicts that Doppler shift is more for a high-speed vehicle than a low-speed vehicle. The Doppler shift ranges from −370.37 Hz to 370.37 Hz, −925.92 Hz to 925.92 Hz, −1296.29 Hz to 1296.29 Hz for 100 km/hr, 250 km/hr, 350 km/hr respectively.

Figure 9:
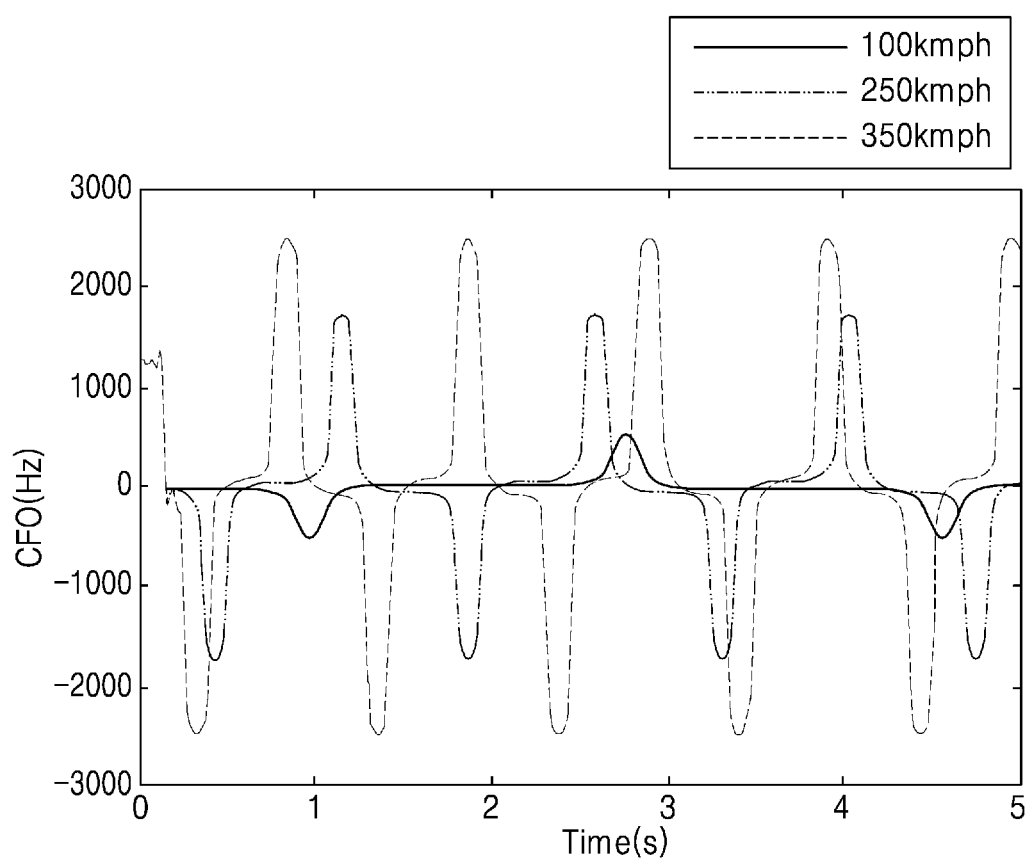
FIG. 9 depicts experimental results, according to an embodiment of the disclosure.

FIG. 9 illustrates a Channel Frequency Offset (CFO) vs. time to confirm throughput improvement in CP level (of UE) according to an embodiment of the disclosure. The channel frequency offset (CFO) is computed by passing the equiripple low pass filter on the doppler shift. The figure depicts that CFO ranges are approximately double than the range of Doppler shift. The figure also depicts that when UE approaches the center of two consecutive gNodeBs Doppler frequency changes from positive to negative slope or vice-versa.

Figure 10:
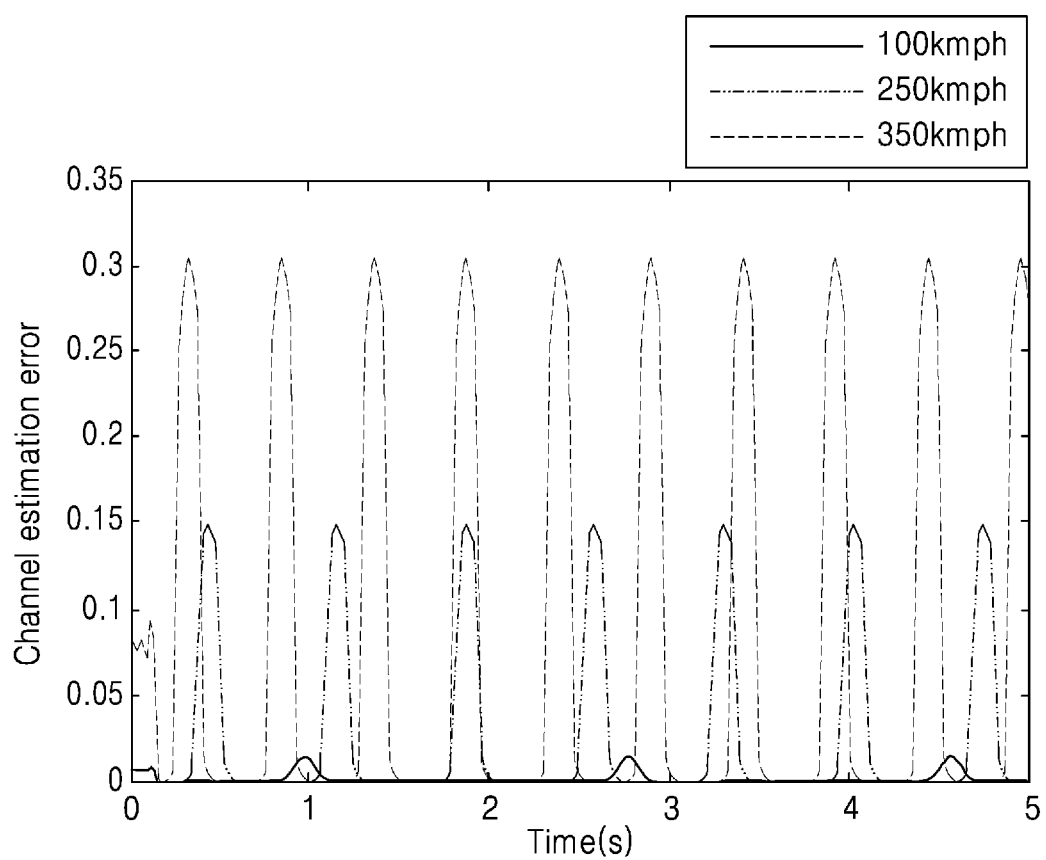
FIG. 10 depicts experimental results, according to an embodiment of the disclosure.

FIG. 10 illustrates Channel Estimation Error (CEE) vs time to confirm throughput improvement in CP level (of UE) according to an embodiment of the disclosure. From the CFO, the UE is unable to estimate frequency shift correctly. Hence the channel estimation error (CCE) is computed, which depicts that CEE is approximately zero when the UE approaches near the gNodeB. The CEE increases gradually till UE reaches at the center of two gNodeBs and further starts decreasing again till UE reaches near to gNodeB. The CEE is maximum at the center of two gNodBs as Doppler shift changes suddenly at this point, which UE is unable to estimate CEE properly. The result shows normalized CEE rises till 0.01, 0.15 and 0.3 for 100 km/h, 250 km/h and 350 km/h, respectively. The CEE is maximized due to which the SINR decreases, thereby reducing the physical and MAC layer throughput which also effects TCP throughput.

Figure 11:
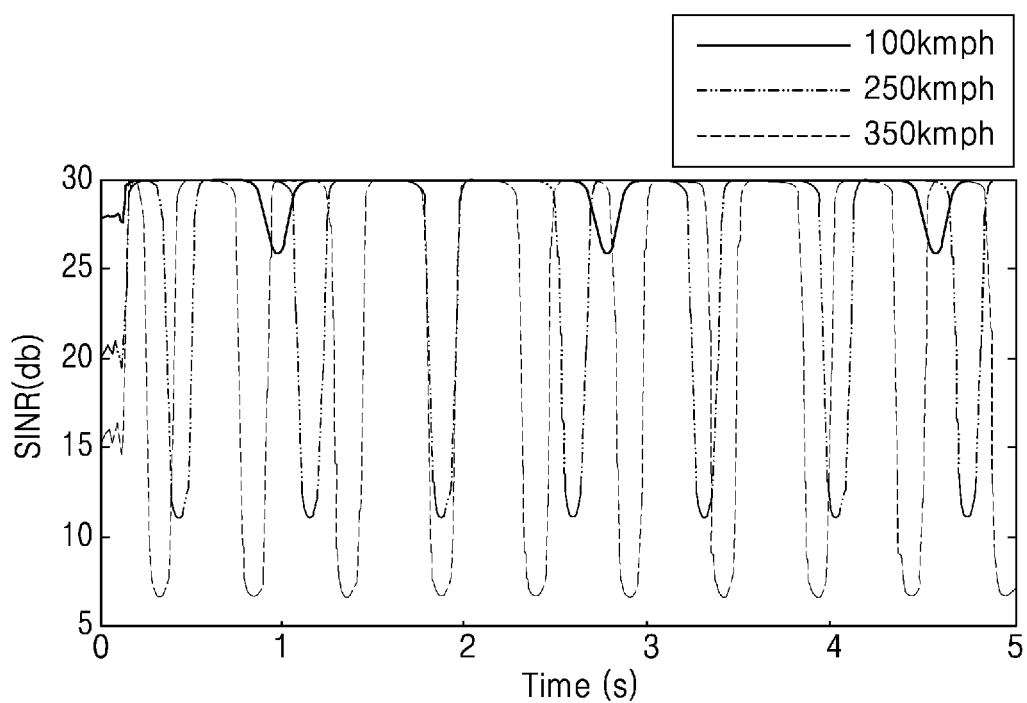
FIG. 11 depicts experimental results, according to an embodiment of the disclosure.

The SINR is computed while the UE is in mobility as shown in FIG. 11 which illustrates SINR vs. Time. FIG. 11 depicts that increase in CEE decreases SINR according to an embodiment of the disclosure. Drop-in SINR is more for a high-speed vehicle than a low-speed vehicle. The SINR drops from 30 dB to 26 dB, 12 dB and 7 dB for 100 km/h, 250 km/h and 350 km/h, respectively.

Figure 12:
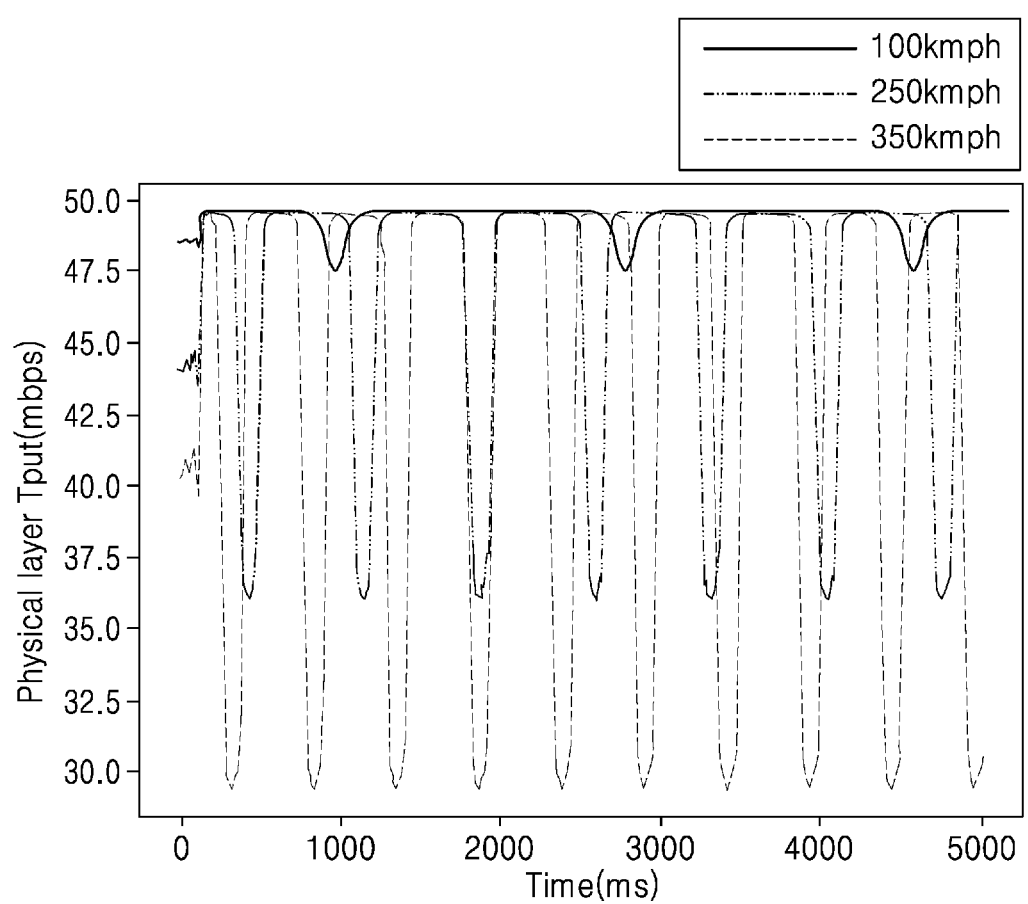
FIG. 12 depicts experimental results, according to an embodiment of the disclosure.

The Physical layer throughput gradually decreases with the decrease in SINR as also illustrated in FIG. 12. The physical layer throughput is approximately 2 Mbps, 13 Mbps, 20 Mbps for 100 km/h, 150 Km/h and 250 Km/h, respectively. The captured physical layer throughput is stipulated to the MAC layer CE/entity which is further mapped to the transport layer using linear regression considering a logical channel.

Figure 13:
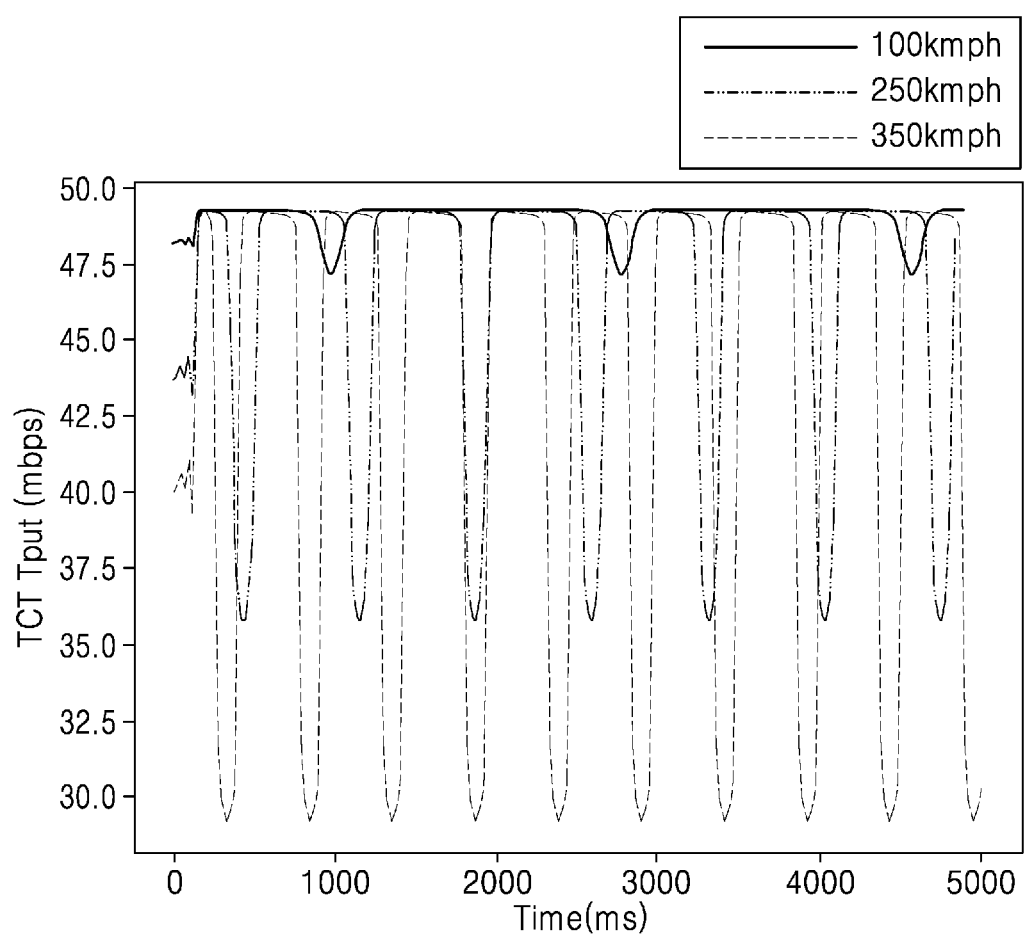
FIG. 13 depicts experimental results, according to an embodiment of the disclosure.

Further, FIG. 13 illustrates the throughput in AP level (of UE) presenting TCP throughput vs. time graph in which TCP throughput drops approximately; 2 Mbps, 13 Mbps and 20 Mbps (due to throughput drop in physical/MAC), when the vehicle is moving at 100 km/h, 250 km/h and 350 km/h. the TCP throughput is maximum when the vehicle (UE) is crossing gNodeB and is minimum when UE is at the center of two consecutive gNodeB's.

The physical layer and transport layer throughput are approximately same computed in our simulation set-up, but in practice, the transport layer throughput is slightly less than physical/MAC layer throughput due to the addition of extra overhead such as padding of header packets and cyclic redundancy check (CRC) failure, etc.

Figure 14:
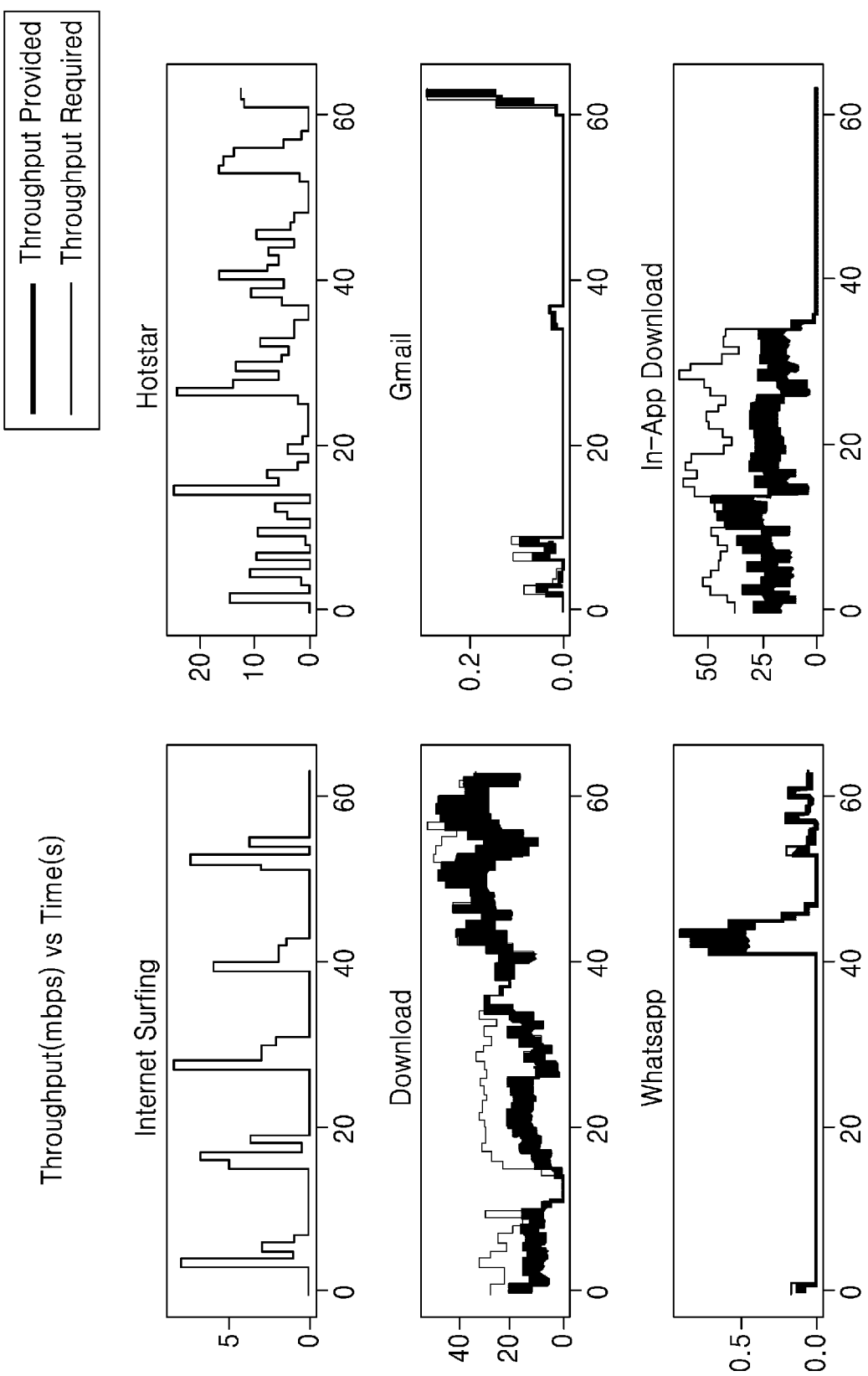
FIG. 14 illustrates throughput distribution in AP level (of UE) using ARC according to an embodiment of the disclosure.

FIG. 14 illustrates throughput distribution in AP level (of UE) using ARC according to an embodiment of the disclosure. For the experiment, TCP-dump is considered to process the requirement of TCP target rate/throughput for six applications. Hotstar™ and Internet browsers are the used foreground apps. The applications as such as Gmail™, download from Google Playstore™, download from Youtube™, WhatsApps™, etc., are considered as background apps. The ARC process is used to predict the throughput requirement for each application and further to distribute throughput based on the RBR received. The grey line shows required TCP throughput by each application and the black line shows TCP layer throughput provided to each application.

Referring to FIG. 14, it further depicts that foreground apps are prioritized and always provided with available throughput at the transport layer received from the MAC layer based on their application throughput requirements. The background apps have throughput deficit and the available throughput captured using ARC is distributed proportional irrespective of the application requirements.

Figure 15A:
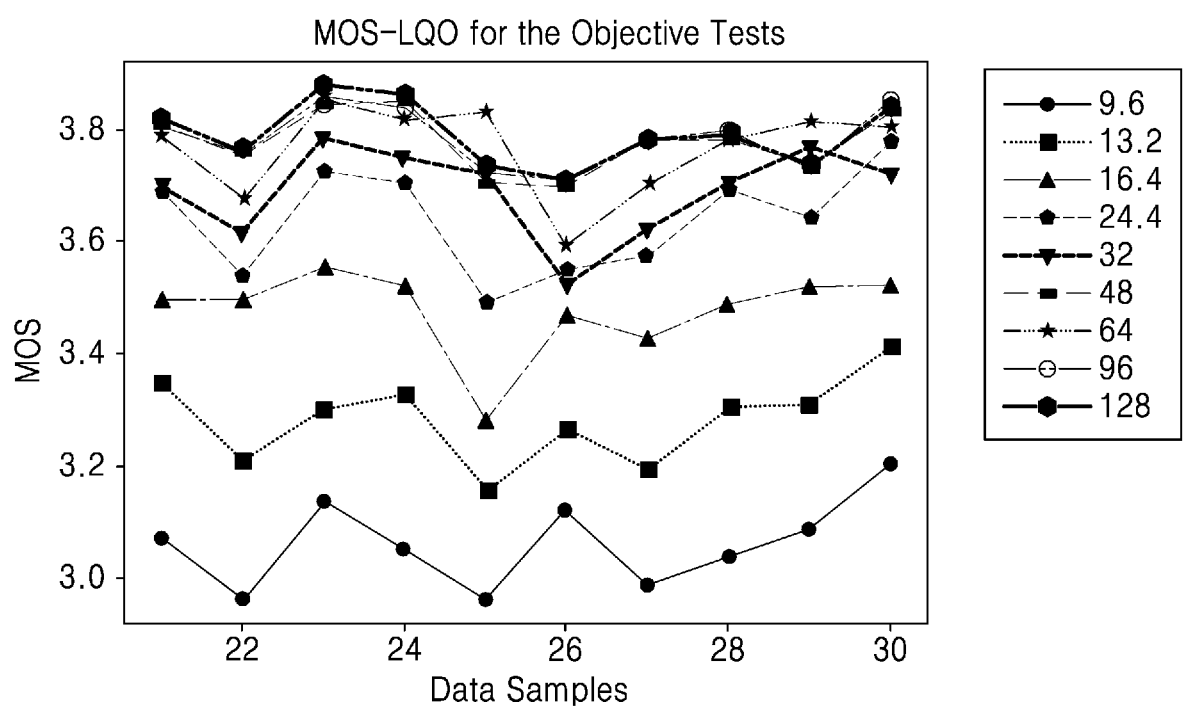
FIGS. 15A and 15B illustrate experimental results demonstrating the MOS value for different Codec Rates (Kbps) according to various embodiments of the disclosure.
Figure 15B:
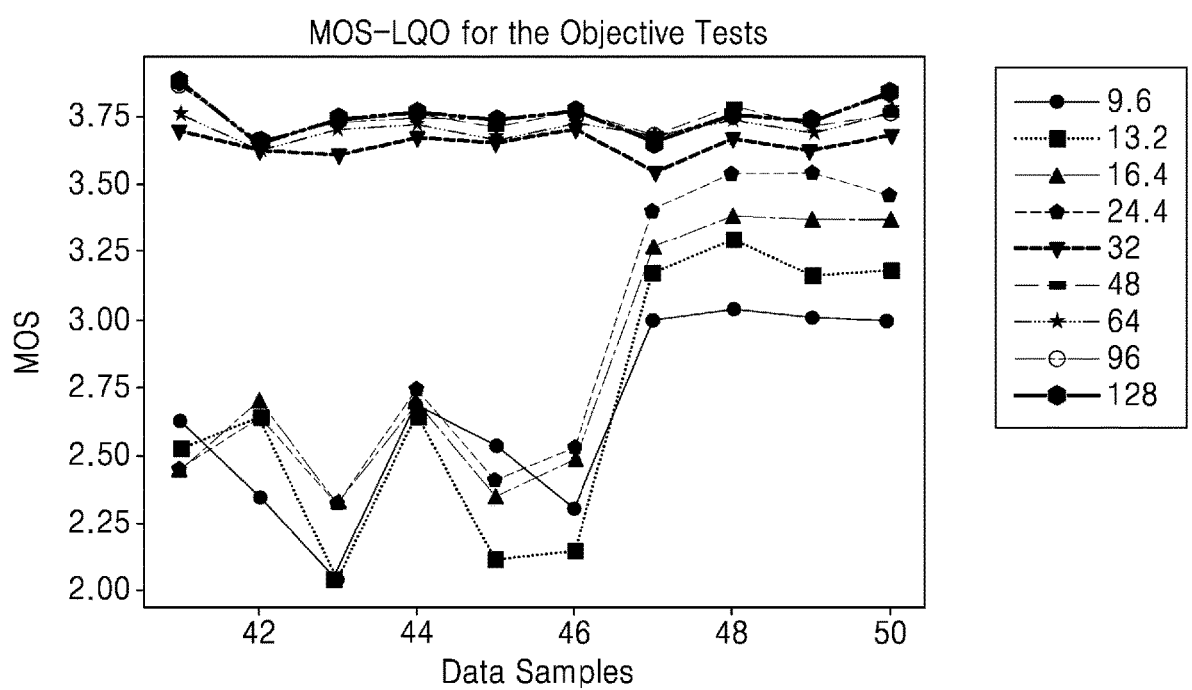

FIGS. 15A and 15B illustrate experimental results demonstrating the MOS value for different Codec Rates (Kbps) according to various embodiments of the disclosure, in which the statistical feedback is received at the UE-1 (AP level) for voice codec adaptation. While changing codec-rate of VoIP packets, it is liable to affect MOS-LQO (Objective Listening Quality) value. However, MOS value/quality of different codec saturates after a certain rate. Hence it is unnecessary to change the codec rate after a certain rate. Following feedback is received at the UE-1 from the UE-2 to select a suitable codec rate to perform adaptation using RL-CRA process. Based on the observed graph as illustrated in figure(s), a dynamic threshold is chosen to perform voice codec adaptation. As for example, if the threshold is chosen as 0.3, based on the MOS value, (i.e., 3.8–3.5), so that codec doesn't have significant switches. Using RL-CRA process the codec rate is dynamically chosen based on a threshold value.

Figure 16A:
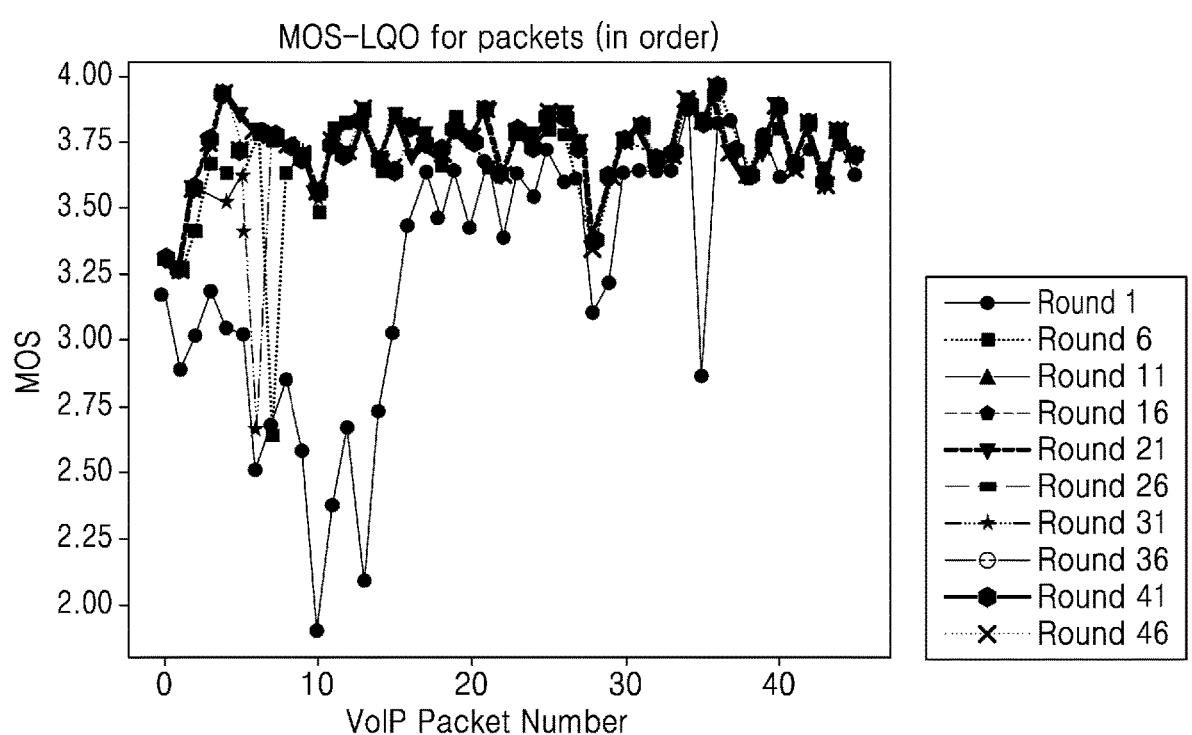
FIGS. 16A and 16B illustrate experimental results regarding MOS value for VoIP packet number for different rounds/epochs according to various embodiments of the disclosure.
Figure 16B:
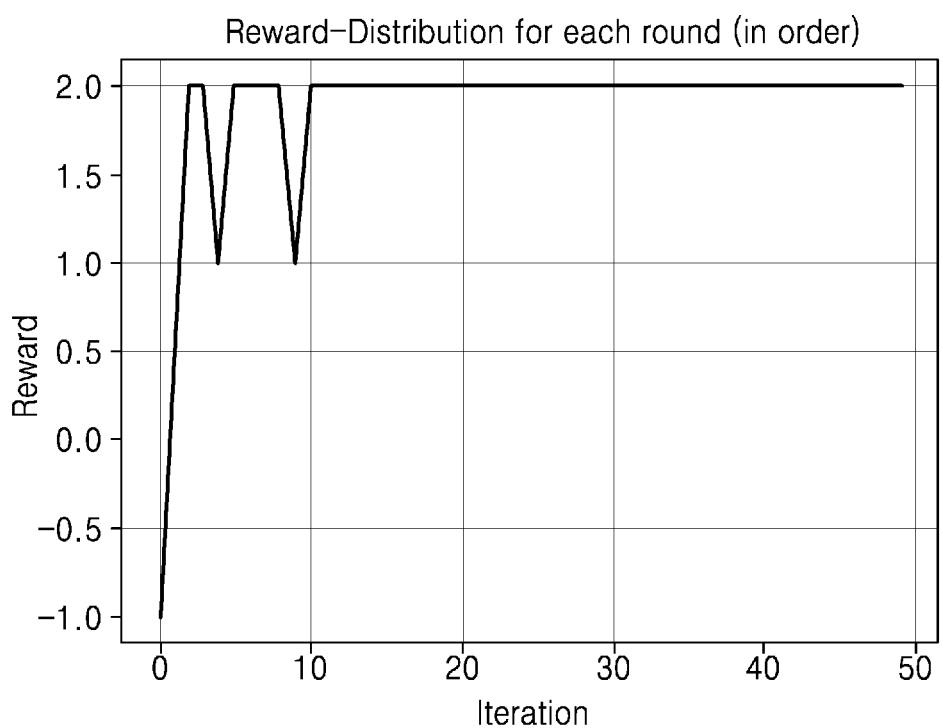

FIGS. 16A and 16B illustrate experimental results regarding MOS value for VoIP packet number for different rounds/epochs according to various embodiments of the disclosure. The result illustrates the deployed Reinforcement Learning based codec rate adaptation (RL-CRA) at AP in the UE (training model/decision module at AP). After initial rounds, the decision module is ensuring that UE obtained the best possible QoS with the available RBR. After certain iterations, the decision module provides a reward to choose suitable round to train the VoIP packets to decide to choose a suitable codec rate.

Figure 17:
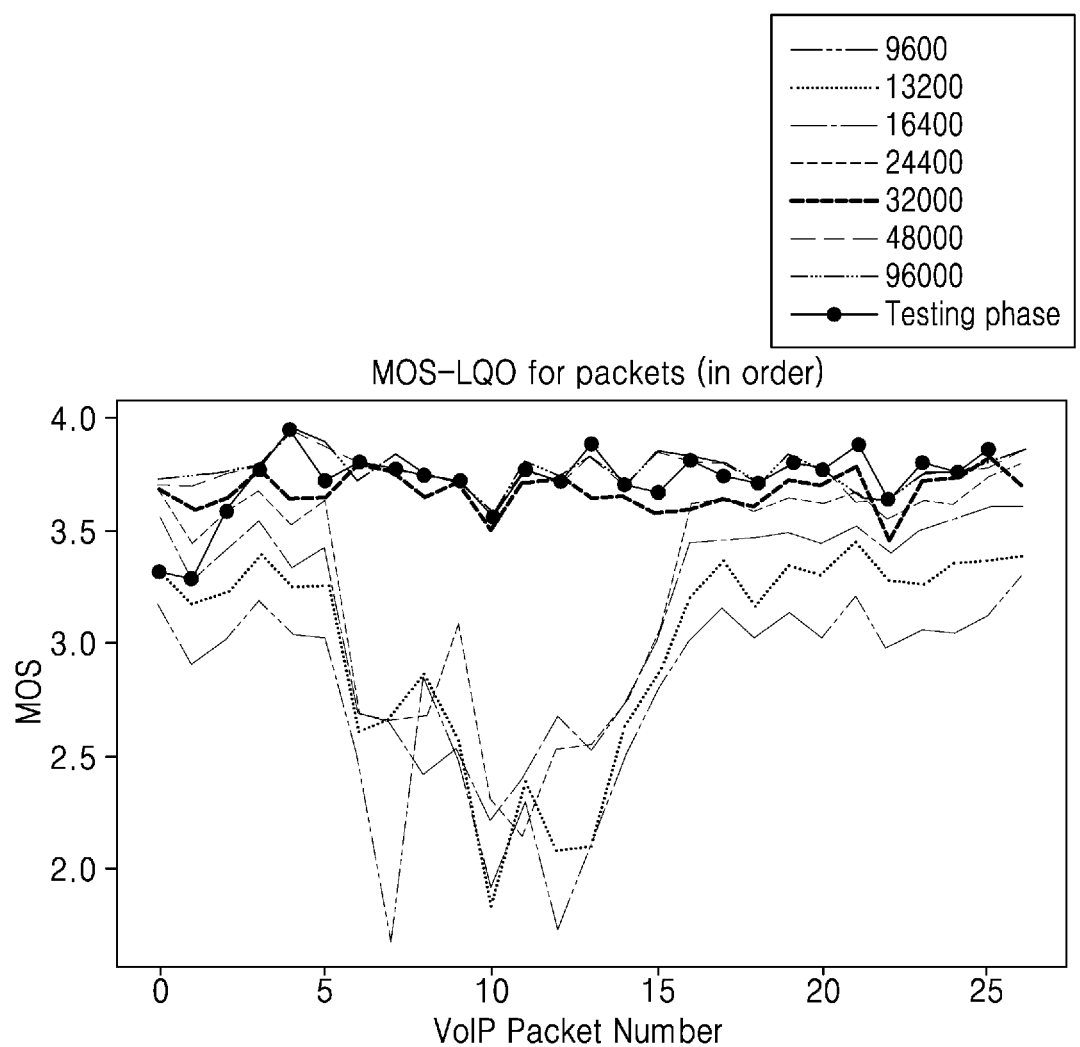
FIG. 17 illustrates experimental results regarding MOS Value for VoIP packet number for different codec rates (kbps) according to an embodiment of the disclosure.

FIG. 17 illustrates experimental results regarding MOS Value for VoIP packet number for different codec rates (kbps) according to an embodiment of the disclosure. The result illustrates the deployed reinforcement learning based codec rate adaptation (RL-CRA) at AP in the UE. Using the RL-CRA process (in decision module), (Objective Tests-PESQ), the Quality of the VoIP packets is always giving us the optimized choice, adapting to various codec rates (in comparison to the other codec-rates).

The Input and output of the platform developed at UE AP to distribute available throughput/RBR are as follows:

Inputs:

Recommended Bit Rate (RBR): RBR received at the AP level from CP level;

Error rate: The error rate is 0.03/0.06 based on network condition as good/bad (as for example, according to Specification, Codec for Enhanced Voice Services (EVS); Performance characterization, 3GPP TR 26.952);

VoIP/Audio Packets: Provide the number of Audio/VoIP packets;

Running Foreground/Back-Ground Applications; and

Current Codec Rate.

Output:

Current MOS value of VoIP packets based on Reinforcement Learning based Codec Rate Adaptation (RL-CRA) process; and Throughput distribution based on available RBR and required rate from each applications using Adaptive Rate Control (ARC) process.

Figure 18:
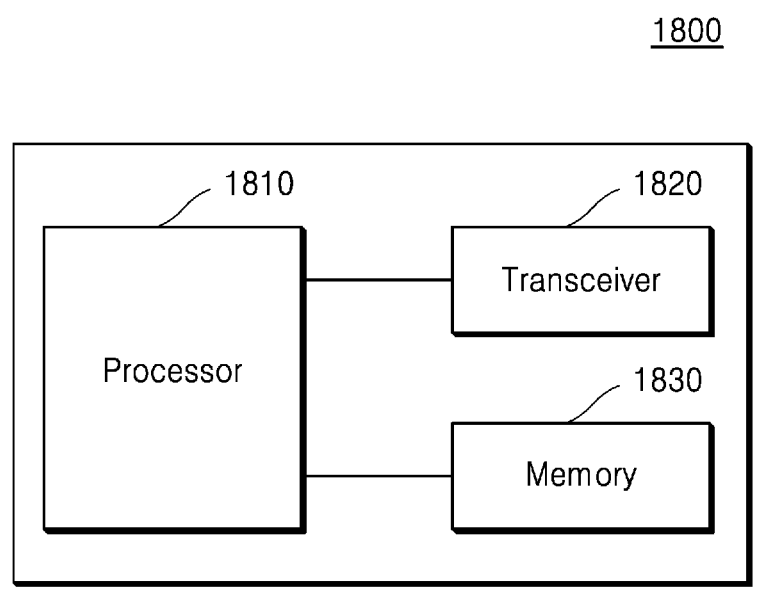
FIG. 18 schematically illustrates a base station according to an embodiment of the disclosure.

FIG. 18 schematically illustrates a base station according to embodiments of the disclosure.

Referring to the FIG. 18, a base station 1800 may include a processor 1810, a transceiver 1820 and a memory 1830. However, all of the illustrated components are not essential. The base station 1800 may be implemented by more or less components than those illustrated in FIG. 18. In addition, the processor 1810 and the transceiver 1820 and the memory 1830 may be implemented as a single chip according to another embodiment.

The base station 1800 may be the gNodeB. The base station (e.g., one of the plurality of base stations 104) described above may correspond to the base station 1800. Also, the network node may correspond to the base station 1800.

The aforementioned components will now be described in detail.

The processor 1810 may include one or more processors or other processing devices that control the proposed function, process, and/or method. Operation of the base station 1800 may be implemented by the processor 1810.

The transceiver 1820 may include a RF transmitter for up-converting and amplifying a transmitted signal, and a RF receiver for down-converting a frequency of a received signal. However, according to another embodiment, the transceiver 1820 may be implemented by more or less components than those illustrated in components.

The transceiver 1820 may be connected to the processor 1810 and transmit and/or receive a signal. The signal may include control information and data. In addition, the transceiver 1820 may receive the signal through a wireless channel and output the signal to the processor 1810. The transceiver 1820 may transmit a signal output from the processor 1810 through the wireless channel.

The memory 1830 may store the control information or the data included in a signal obtained by the base station 1800. The memory 1830 may be connected to the processor 1810 and store at least one instruction or a protocol or a parameter for the proposed function, process, and/or method. The memory 1830 may include read-only memory (ROM) and/or random access memory (RAM) and/or hard disk and/or CD-ROM and/or DVD and/or other storage devices.

Figure 19:
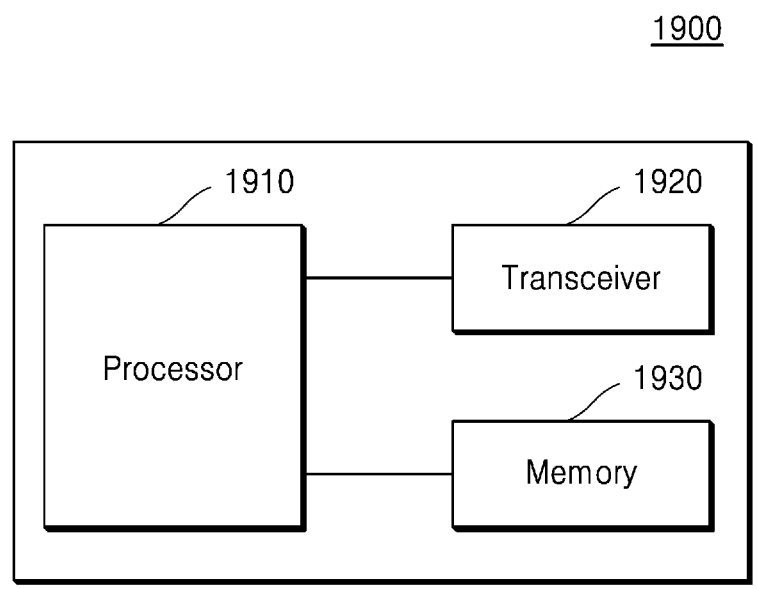
FIG. 19 illustrates a user equipment (UE) according to an embodiment of the disclosure.

FIG. 19 illustrates a user equipment (UE) according to an embodiment of the disclosure.

Referring to FIG. 19, a UE 1900 may include a processor 1910, a transceiver 1920 and a memory 1930. However, all of the illustrated components are not essential. The UE 1900 may be implemented by more or less components than those illustrated in FIG. 19. In addition, the processor 1910 and the transceiver 1920 and the memory 1930 may be implemented as a single chip according to another embodiment.

The UE0 102 illustrated in FIGS. 1A and 1B may correspond to the UE 1900. Also, the UE 102 illustrated in FIG. 2 may correspond to the UE 1900.

The aforementioned components will now be described in detail.

The processor 1910 may include one or more processors or other processing devices that control the proposed function, process, and/or method. Operation of the UE 1900 may be implemented by the processor 1910.

The transceiver 1920 may include a RF transmitter for up-converting and amplifying a transmitted signal, and a RF receiver for down-converting a frequency of a received signal. However, according to another embodiment, the transceiver 1920 may be implemented by more or less components than those illustrated in components.

The transceiver 1920 may be connected to the processor 1910 and transmit and/or receive a signal. The signal may include control information and data. In addition, the transceiver 1920 may receive the signal through a wireless channel and output the signal to the processor 1910. The transceiver 1920 may transmit a signal output from the processor 1910 through the wireless channel.

The memory 1930 may store the control information or the data included in a signal obtained by the UE 1900. The memory 1930 may be connected to the processor 1910 and store at least one instruction or a protocol or a parameter for the proposed function, process, and/or method. The memory 1930 may include read-only memory (ROM) and/or random access memory (RAM) and/or hard disk and/or CD-ROM and/or DVD and/or other storage devices.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) of distributing throughput amongst a plurality of applications residing at the UE, the method comprising:
    receiving, from a network node, recommended bit rate (RBR) information indicating a throughput value allocated to the UE;
    allocating a codec rate to at least one voice over internet protocol (VoIP) application among the plurality of applications residing at the UE, based on the throughput value allocated to the UE; and
    allocating a bit rate to each of a plurality of non-VoIP applications among the plurality of applications residing at the UE, based on a throughput requirement respectively associated with the plurality of non-VoIP applications and a remaining throughput value of the throughput value allocated to the UE,
    wherein the codec rate comprises a throughput associated with a VoIP application and the bit rate comprises a throughput associated with a non-VoIP application.

2. The method of claim 1,
    wherein the allocating of the bit rate to each of the plurality of non-VoIP applications based on the corresponding throughput requirement comprises allocating the bit rate to at least one of a first set of applications or a second set of applications among the plurality of non-VoIP applications,
    wherein the first set of applications comprises one or more foreground applications,
    wherein the second set of applications comprises one or more background applications, and
    wherein allocating the bit rate to the second set of applications is performed after allocating the bit rate to the first set of applications.

3. The method of claim 2,
    wherein the allocating of the bit rate to at least one of the first set of applications or the second set of applications among the plurality of non-VoIP applications comprises allocating the bit rate based on an allocation order, and
    wherein the allocation order comprises a descending order determined based on a value of the corresponding throughput requirement associated with the plurality of non-VoIP applications.

4. The method of claim 1, wherein the allocating of the codec rate from the throughput value allocated to the UE to the at least one VoIP application comprises allocating the codec rate based on a codec rate indicator included in the RBR information.

5. The method of claim 1, wherein the allocating of the codec rate from the throughput value allocated to the UE to the at least one VoIP application comprises allocating the codec rate based on a quality feedback report associated with a packet transmitted by the at least one VoIP application.

6. The method of claim 5, wherein the allocating of the codec rate based on the quality feedback report associated with the packet transmitted by the at least one VoIP application further comprises:
    in response to the quality feedback report indicating a first quality, increasing a current codec rate by a predetermined value;
    in response to the quality feedback report indicating a second quality, maintaining the current codec rate; and
    in response to the quality feedback report indicating a third quality, decreasing the current codec rate by the predetermined value.

7. The method of claim 1, further comprising:
    determining throughput requirements corresponding to each of the at least one VoIP application or the plurality of non-VoIP applications, respectively, based on corresponding application response description (ARD) information, the ARD information indicating a bit rate requirement for a service requested by an application;
    transmitting, to the network node, an RBR query based on the determined throughput requirements; and
    receiving, from the network node, an RBR response comprising the RBR information indicating the throughput value allocated to the UE.

8. A user equipment (UE), comprising:
    a transceiver;
    a memory storing at least one instruction; and
    at least one processor configured to:
        receive, from a network node, recommended bit rate (RBR) information, the RBR information indicating a throughput value allocated to the UE;
        allocate a codec rate to at least one voice over internet protocol (VoIP) application among a plurality of applications residing at the UE, based on the throughput value allocated to the UE; and
        allocate a bit rate to each of a plurality of non-VoIP applications among the plurality of applications residing at the UE, based on a throughput requirement respectively associated with the plurality of non-VoIP applications and a remaining throughput value of the throughput value allocated to the UE,
    wherein the codec rate comprises a throughput associated with a VoIP application and the bit rate comprises a throughput associated with a non-VoIP application.

9. The UE of claim 8,
wherein the processor is further configured to:
- allocate the bit rate to at least one of a first set of applications or a second set of applications among the plurality of non-VoIP applications, wherein the first set of applications comprises one or more foreground applications, wherein the second set of applications comprises one or more background applications, and wherein allocating of the bit rate to the second set of applications is performed after allocating the bit rate to the first set of applications.

10. The UE of claim 9,
wherein the processor is further configured to:
- allocate the bit rate based on an allocation order, and wherein the allocation order comprises a descending order determined based on a value of the corresponding throughput requirement associated with the plurality of non-VoIP applications.

11. The UE of claim 8, wherein the processor is further configured to:
- allocate the codec rate based on a codec rate indicator included in the RBR information.

12. The UE of claim 8, wherein the processor is further configured to:
- allocate the codec rate based on a quality feedback report associated with a packet transmitted by the at least one VoIP application.

13. The UE of claim 12, wherein the processor is further configured to:
- in response to the quality feedback report indicating a first quality, increase a current codec rate by a predetermined value,
- in response to the quality feedback report indicating a second quality, maintain the current codec rate, and
- in response to the quality feedback report indicating a third quality, decrease the current codec rate by the predetermined value.

* * * * *